United States Patent
Wariishi et al.

(10) Patent No.: US 7,459,231 B2
(45) Date of Patent: *Dec. 2, 2008

(54) POLYMER ELECTROLYTE FUEL CELL STACK AND OPERATING METHOD THEREOF

(75) Inventors: Yoshinori Wariishi, Utsunomiya (JP); Naoyuki Enjoji, Utsunomiya (JP); Hideaki Kikuchi, Tochigi-ken (JP); Narutoshi Sugita, Utsunomiya (JP); Masaharu Suzuki, Utsunomiya (JP); Seiji Sugiura, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 623 days.

This patent is subject to a terminal disclaimer.

(21) Appl. No.: 10/469,878

(22) PCT Filed: Mar. 5, 2002

(86) PCT No.: PCT/JP02/02011

§ 371 (c)(1),
(2), (4) Date: Apr. 5, 2004

(87) PCT Pub. No.: WO02/071525

PCT Pub. Date: Sep. 12, 2002

(65) Prior Publication Data

US 2004/0161649 A1 Aug. 19, 2004

(30) Foreign Application Priority Data

Mar. 6, 2001 (JP) ............................. 2001-061499

(51) Int. Cl.
H01M 8/04 (2006.01)
H01M 8/10 (2006.01)
H01M 8/24 (2006.01)

(52) U.S. Cl. .............................. 429/38; 429/32; 429/39
(58) Field of Classification Search ...................... None
See application file for complete search history.

(56) References Cited

U.S. PATENT DOCUMENTS 5,776,625 A   7/1998   Kaufman et al. .............. 429/30

(Continued)

FOREIGN PATENT DOCUMENTS

| EP | 0 596 366 A1 | 5/1994 |
| JP | 07-320755 | 12/1995 |
| WO | WO 9905739 A1 * | 2/1999 |

OTHER PUBLICATIONS

Canadian Office Action for Application No. 2439967, dated Aug. 13, 2007.

*Primary Examiner*—Jonathan Crepeau
*Assistant Examiner*—Robert Hodge
(74) *Attorney, Agent, or Firm*—Lahive & Cockfield, LLP; Anthony A. Laurentano, Esq.

(57) ABSTRACT

A fuel cell stack (10) includes a first sub-stack (12), a second sub-stack (14), and a third sub-stack (16) disposed in the flow direction of an oxidizing gas. An intermediate plate (18a) is interposed between the first and second sub-stacks (12, 14), and an intermediate plate (18b) is interposed between the second and third sub-stacks (14, 16). In this fuel stack (10), the flow of an oxidizing gas is set such that the oxidizing gas flows in series in the direction from the first sub-stack (12) to the third sub-stack (16). Between the sub-stacks additional oxidizing gas supplies (70,74) are provided through which oxidizing gas of lower humidity than the humidity of the oxidizing gas entering the first sub-stack is supplied. This arrangement allows an efficient management of the humidity water content of the oxidizing gas with sufficient moisturizing of the solid polymer membrane whilst avoiding excessive condensation of water vapour within the stack.

9 Claims, 19 Drawing Sheets

U.S. PATENT DOCUMENTS

| | | | |
|---|---|---|---|
| 5,935,726 A | 8/1999 | Chow et al. | 429/13 |
| 6,015,634 A | 1/2000 | Bonville, Jr. et al. | 429/17 |
| 6,033,794 A | 3/2000 | George et al. | |
| 6,251,534 B1 * | 6/2001 | McElroy | 429/13 |
| 6,534,209 B1 * | 3/2003 | Hauer | 429/13 |
| 6,926,985 B2 * | 8/2005 | Wariishi et al. | 429/32 |
| 7,201,990 B2 * | 4/2007 | Wariishi et al. | 429/39 |
| 2002/0009623 A1 * | 1/2002 | St-Pierre et al. | 429/13 |
| 2002/0017463 A1 * | 2/2002 | Merida-Donis | 204/551 |

* cited by examiner

POLYMER ELECTROLYTE FUEL CELL STACK AND OPERATING METHOD THEREOF

RELATED APPLICATIONS

This application is a 35 U.S.C. 371 national stage filing of International Application No. PCT/JP02/02011, filed 5 Mar. 2002, which claims priority to Japan Patent Application No. 2001-61499 filed on 6 Mar. 2001 in Japan. The contents of the aforementioned applications are hereby incorporated by reference.

1. Technical Field

The present invention relates to a fuel cell stack including a plurality of unit cells stacked to each other, wherein each of the unit cells has a unified body formed by holding a solid polymer electrolyte membrane between an anode and a cathode, and a method of operating the fuel cell stack.

2. Background Art

In general, a solid polymer electrolyte fuel cell (PEFC) includes a unit cell (unit electric power generation cell) formed by holding a unified body (membrane-electrode assembly) between separators (bipolar plates). The unified body is formed by disposing an anode and a cathode on both sides of an electrolyte membrane composed of a polymer ion exchange membrane (cation exchange membrane). Each of the anode and cathode is formed by joining a noble metal based catalyst electrode layer on a base member mainly made from carbon. The solid polymer electrolyte fuel cell is generally used in the form of a fuel cell stack composed of a stack of a specific number of the unit cells.

In the fuel cell of this type, when a fuel gas, for example, a gas mainly containing hydrogen (hereinafter, referred to as "hydrogen containing gas") is supplied to the anode, hydrogen in the hydrogen containing gas is ionized on the catalyst electrode and is migrated to the cathode side via the electrolyte, and electrons generated by such cell reaction are taken to an external circuit, to be used as electric energy in the form of a direct current. In this case, an oxidizing gas, for example, a gas mainly containing oxygen or air (hereinafter, referred to as "oxygen containing gas") is supplied to the cathode, so that hydrogen ions, electrons and oxygen react with each other to produce water on the cathode.

By the way, in the above fuel cell stack, if the electrolyte membrane becomes dried, a high output density operation cannot be continued, and accordingly, the electrolyte membrane must be suitably humidified. For this viewpoint, there have been adopted various humidifying methods, for example, an externally humidifying method of humidifying a reaction gas (fuel gas/oxidizing gas) by a humidifier such as a bubbler provided outside a fuel cell stack, to supply water in each unified body, thereby humidifying an electrolyte membrane of the unified body; an internally humidifying method of humidifying an electrolyte membrane by a humidifier (humidifying structure) provided in a unit cell; and a self-humidifying method as one kind of the internally humidifying method, which is adapted to humidify an electrolyte membrane by making use of water produced by electrochemical reaction in, the electrolyte membrane.

The above externally humidifying method, however, has problems that since an additional humidifier is provided outside the fuel cell stack, the size of the whole fuel cell stack becomes large, to enlarge an occupied space of the fuel cell stack, and that the follow-up characteristic of the humidifier cannot sufficiently keep up with a rapid increase in load of the fuel cell stack.

The above internally humidifying method is generally carried out by burying a water-absorbed thread in an electrolyte membrane, diffusing water from the anode side via a water permeation plate, or bringing a water-absorbed thread into contact with a portion, on the anode side, of an electrolyte membrane. Such a method, however, has a problem that if the humidification becomes insufficient for some reason, such an inconvenient state cannot be suitably repaired.

The above self-humidifying method is generally carried out by dispersing fine particles of platinum in an electrolyte membrane, and producing water in the electrolyte membrane by reaction between hydrogen gas and oxygen gas permeating from an anode and a cathode, or by making the thickness of an electrolyte membrane very thin, to diffuse water produced on the cathode side, thereby supplying water to the anode side. According to such a method, however, since a special electrolyte membrane must be produced, the production cost is raised, and further, it is difficult to obtain an electrolyte membrane capable of sufficiently exhibiting a desired characteristic.

To solve the above-described problems, the present invention has been made, and an object of the present invention is to provide a fuel cell stack capable of positively obtaining a desired humidified state without use of any special humidifying apparatus, and achieving efficient electric power generation, and to provide a method of operating the fuel cell stack.

DISCLOSURE OF INVENTION

According to exemplary embodiments of the present invention a fuel cell stack and a method of operating a fuel cell stack are provided. At least two sub-stacks composed of first and second sub-stacks, each of which has a plurality of unit cells stacked to each other, are provided. Each of the unit cells has a unified body formed by holding a solid polymer electrolyte membrane between an anode and a cathode. Each of the unit cells also has a supply passage and a discharge passage for supplying and discharging at least one of a fuel gas and an oxidizing gas as reaction gases. Further, the discharge passage in the first sub-stack disposed on the upstream side in the supply direction of the reaction gas is communicated in series to the supply passage in the second sub-stack disposed on the downstream side in the supply direction of the reaction gas.

The fuel cell stack and the operating method thereof are characterized in that the reaction gas humidified with water in an amount necessary for operating the first sub-stack is supplied in the first sub-stack via the supply passage, and a reaction gas having a humidity lower than that of the humidified reaction gas supplied to the first sub-stack is supplied in the second sub-stack independently from the supply passage of the second sub-stack.

With this configuration, the low humidity reaction gas can be humidified by making use of water produced in the first sub-stack, and the reaction gas thus humidified can be supplied in the second sub-stack. As a result, it is possible to effectively reduce the amount of humidifying water supplied to the whole fuel cell stack and hence to miniaturize the humidifying structure. That is to say, since the amount of humidifying water is reduced, it is possible to miniaturize the externally humidifier and to eliminate or miniaturize the internally humidifying mechanism.

An intermediate plate may be disposed at a portion at which the discharge passage in the first sub-stack is connected to the supply passage in the second sub-stack, wherein the intermediate plate may have a communication portion for communicating the additional reaction gas supply passage to the supply passage in the second sub-stack. With this configuration, it is possible to simplify the piping between the first and second sub-stacks and thereby miniaturize the whole fuel cell stack, and to shorten the length of the piping and thereby prevent occurrence of dew condensation in the piping.

A reaction gas having a humidity lower than that of the humidified reaction gas supplied to the first sub-stack can be supplied in the supply passage in the second sub-stack through the above communication portion of the intermediate plate. With this configuration, even if a low humidity reaction is supplied in the second sub-stack, the humidity in the second sub-stack can be sufficiently kept at a high value. As a result, it is possible to uniformly keep the current density distribution, and hence to improve the electric power generation performance and the durability.

Each of the unit cells constituting the second sub-stack has a mixing portion in which the additional reaction gas supply passage is communicated to the supply passage in the second sub-stack, wherein the mixing portion is adapted to mix the residue of the reaction gas having been used for reaction with the low humidity reaction gas and supply the mixture to the unified body of each of the unit cells constituting the second sub-stack. With this configuration, it is possible to equalize the humidity of one unit cell to that of another unit cell, and hence to uniformly keep the humidity distribution in the second sub-stack.

The reaction gas may be an oxidizing gas, and the number of the units constituting the second sub-stack be larger than the number of the unit cells constituting the first sub-stack. With this configuration, it is possible to further reduce the amount of humidifying water contained in the reaction gas supplied to the whole fuel cell stack, and hence to improve the utilization ratio of the reaction gas.

According to an exemplary method of operating a fuel cell stack, an oxidizing gas humidified with water in an amount necessary for operating the first sub-stack, which includes the unit cells of the number smaller than that of the unit cells in the second sub-stack, is supplied in the first sub-stack, and is discharged from the discharge passage in the first sub-stack into the supply passage in the second sub-stack. At this time, since water is provided by reaction in the first sub-stack, a low humidity oxidizing gas to be supplied in the second sub-stack can be sufficiently humidified. As a result, it is possible to effectively reduce the amount of humidifying water supplied to the whole fuel cell stack.

According to another exemplary method of operating a fuel cell stack, a fuel gas humidified with water in an amount necessary for operating the first sub-stack is supplied in the first sub-stack via the supply passage, and is discharged from the discharge passage in the first sub-stack into the supply passage of the second sub-stack including the unit cells of the number equal to or smaller than that of the unit cells of the first sub-stack. At this time, since water contained in the fuel gas supplied in the first sub-stack is supplied in the second sub-stack without reduction of the amount of humidifying water, it is possible to reduce the amount of humidifying water contained in the fuel gas supplied to the whole fuel cell stack, and to reduce the total amount of the fuel gas.

According to yet another method of operating a fuel cell stack, an oxidizing gas is supplied from the first sub-stack to the second sub-stack and a fuel gas is supplied from the second sub-stack to the first sub-stack, and the amounts of water for humidifying the oxidizing gas and fuel gas are minimized. With this configuration, it is possible to further reduce the amounts of humidifying water supplied to the whole fuel cell stack, and to improve the utilization ratios of the oxidizing gas and fuel gas.

According to an exemplary fuel cell stack and an exemplary method of operating a fuel cell, a plurality of unit cells stacked to each other are provided. Each of the unit cells has a unified body formed by holding a solid polymer electrolyte membrane between an anode and a cathode. A supply passage for supplying at least one of a fuel gas and an oxidizing gas as reaction gases is provided in each of reaction surfaces of the unified body.

In the fuel cell stack and the operating method thereof, at least one of the reaction surfaces of the unified body is divided into a first reaction surface disposed on the upstream side in the supply direction of the reaction gas and communicated to the supply passage and at least one second reaction surface on the downstream side in the supply direction of the reaction gas, wherein the reaction gas humidified with water in an amount necessary for reaction on the first reaction surface is supplied to the first reaction surface, and a reaction gas having a humidity lower than the humidified reaction gas supplied to the first reaction surface is supplied to the second reaction surface independently from the supply passage. With this configuration, the second reaction surface can be humidified by making use of water produced on the first reaction surface. As a result, it is possible to effectively reduce the amount of humidifying water, and hence to miniaturize the humidifying mechanism including an externally humidifying apparatus and an internally humidifying mechanism.

A meandering reaction passage may be provided in such a manner as to extend from the first reaction surface to the second reaction surface, and a communication portion for communicating the meandering reaction gas passage to the additional reaction gas supply passage be provided at a return portion of the meandering reaction gas passage. At this time, the area of the second reaction surface may be set to be larger than the area of the first reaction surface. With these configurations, it is possible to further reduce the amount of humidifying water supplied to the whole fuel cell stack, and to improve the utilization ratio of the reaction gas.

According to an exemplary fuel cell stack, a reaction gas humidified with water in an amount necessary for operating the first sub-stack is supplied in the first sub-stack via the supply passage, and a reaction gas having a humidity lower than that of the reaction gas supplied in the first sub-stack is supplied in the second sub-stack independently from the supply passage. On the other hand, at least one of the reaction surfaces of the unified body is divided into the first reaction surface disposed on the upstream side in the supply direction of the reaction gas and communicated to the supply passage, and the at least one second reaction surface disposed on the downstream side in the supply direction of the reaction gas, wherein the reaction gas humidified with water in an amount necessary for reaction on the first reaction surface is supplied in the first reaction surface, and a reaction gas having a humidity lower than that of the reaction gas supplied in the first reaction surface is supplied in the second reaction surface independently from the supply passage. With this configuration, it is possible to effectively reduce the amount of humidifying water, and hence to miniaturize the humidifying structure.

Part of the spent reaction gas may be returned to the reaction gas inlet side of the fuel cell stack. With this configuration, it is possible to humidify the whole fuel cell stack by circulating water contained in the spent reaction gas, and hence to easily attain the operation with no humidification.

The above and other objects, features, and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
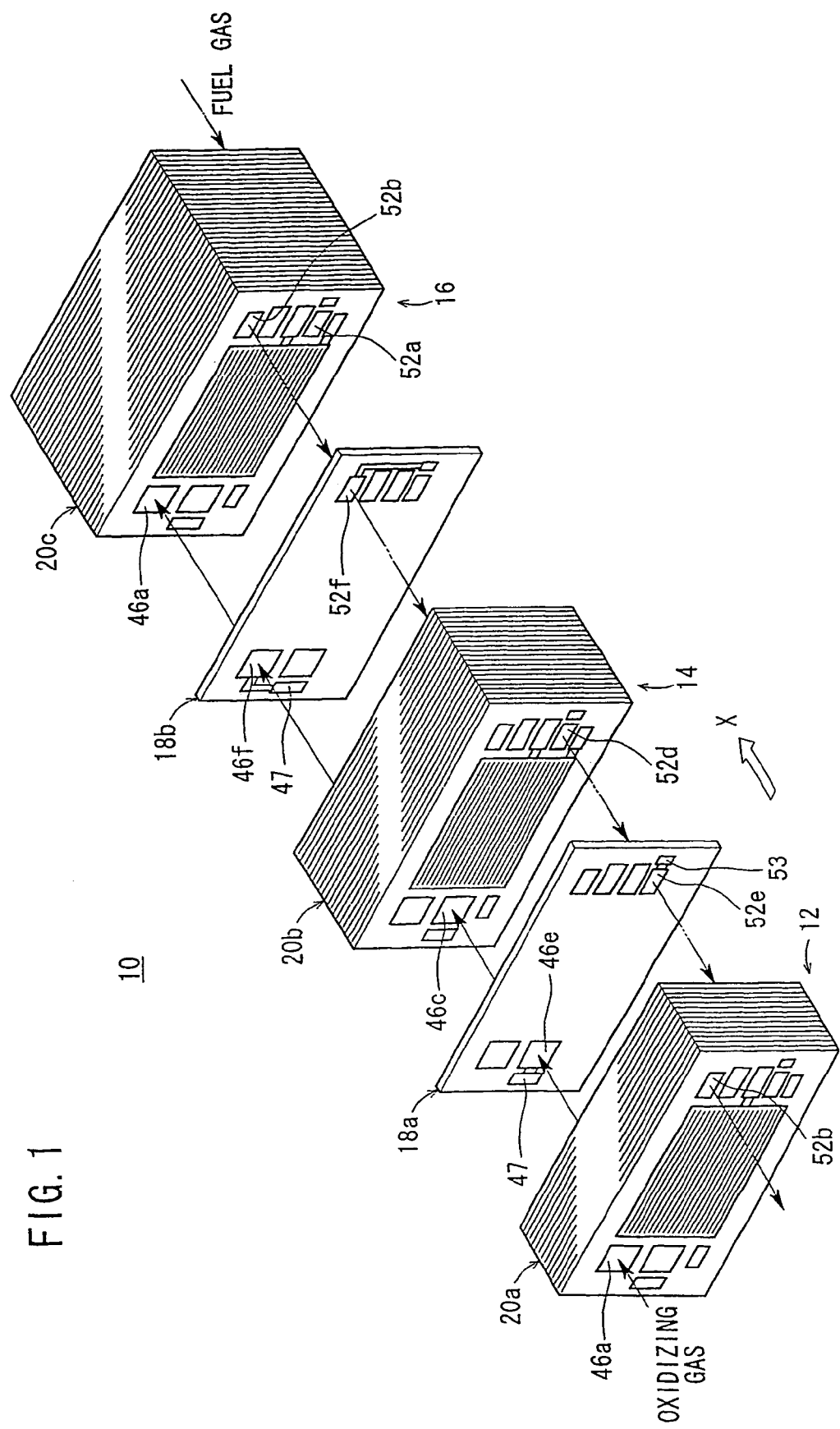
FIG. 1 is an illustrative exploded perspective view of an essential portion of a fuel cell stack according to a first embodiment of the present invention.

FIG. 1 is an illustrative exploded perspective view of an essential portion of a fuel cell stack 10 according to a first embodiment of the present invention.

The fuel cell stack 10 includes a first sub-stack 12, a second sub-stack 14, and a third sub-stack 16 disposed in the flow direction (shown by an arrow X) of a reaction gas, for example, an oxidizing gas. An intermediate plate 18a is interposed between the first and second sub-stacks 12 and 14, and an intermediate plate 18b is interposed between the second and third sub-stacks 14 and 16. The first sub-stack 12 is formed by stacking a specific number of sets of cell assemblies 20a to each other in the direction X; the second sub-stack 14 is formed by stacking a specific number of sets of cell assemblies 20b to each other in the direction X; and the third sub-stack 16 is formed by stacking a specific number of sets of cell assemblies 20c to each other in the direction X. It is to be noted that the flow direction of a fuel gas is set to be opposite to the flow direction of the oxidizing gas in the first embodiment; however, it may be set to be identical to the flow direction of the oxidizing gas.

Figure 2:
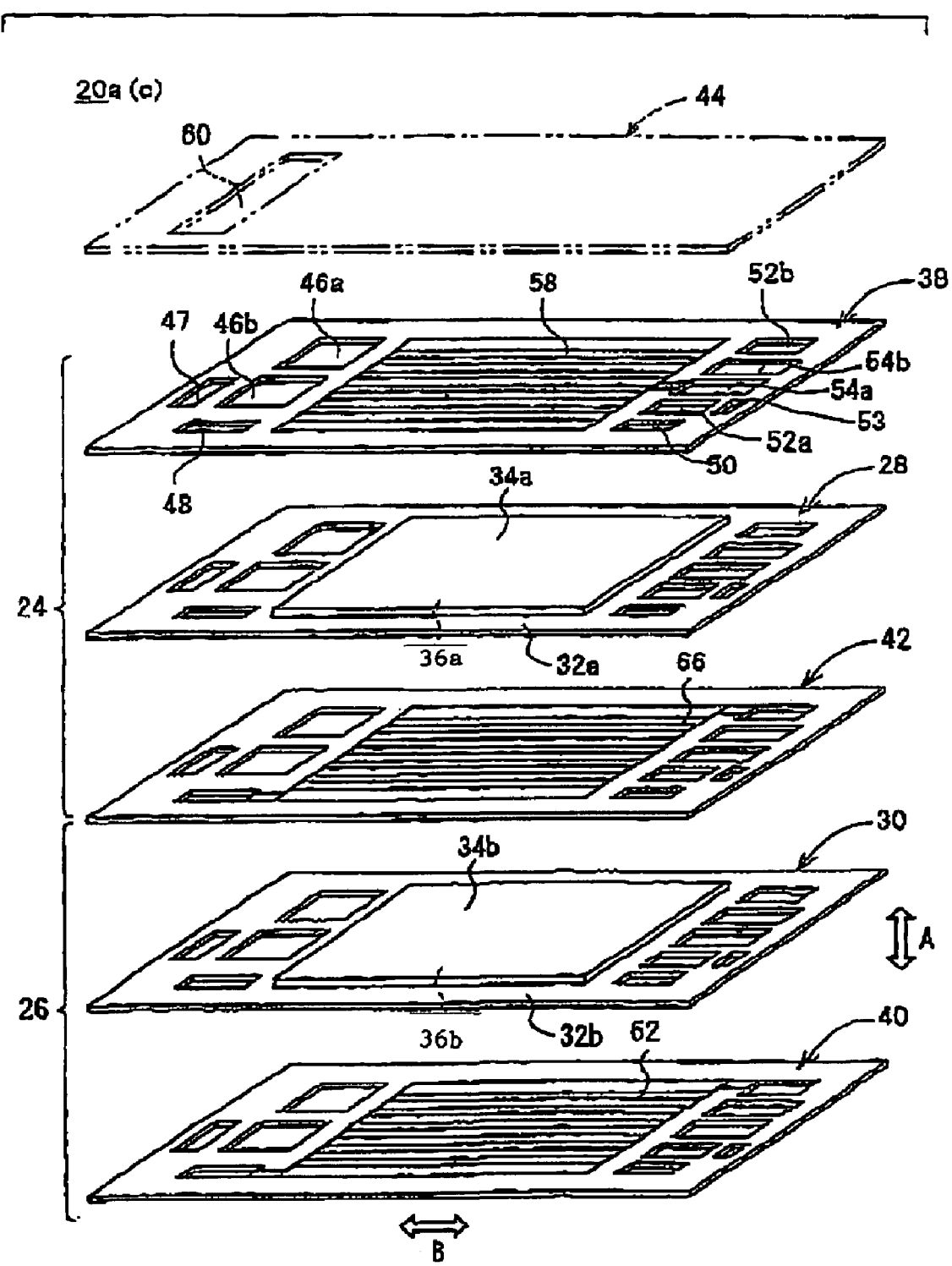
FIG. 2 is an exploded perspective view of a cell assembly of the fuel cell stack shown in FIG. 1.

As shown in FIG. 2, each of the cell assemblies 20a and 20c is formed by stacking a first unit cell 24 and a second unit cell 26 to each other. The first unit cell 24 includes a first unified body 28, and the second unit cell 26 includes a second unified body 30.

The first unified body 28 has a solid polymer electrolyte membrane 32a, and a cathode 34a and an anode 36a disposed with the electrolyte membrane 32a put therebetween. The second unified body 30 has a solid polymer membrane 32b, and a cathode 34b and an anode 36b disposed with the electrolyte membrane 32b put therebetween. Each of the cathodes 34a and 34b and the anodes 36a and 36b is obtained by forming a noble metal based catalyst electrode layer on a base member mainly made from carbon and forming a porous gas diffusion layer represented by a porous carbon paper on the surface of the catalyst electrode layer.

Figure 3:
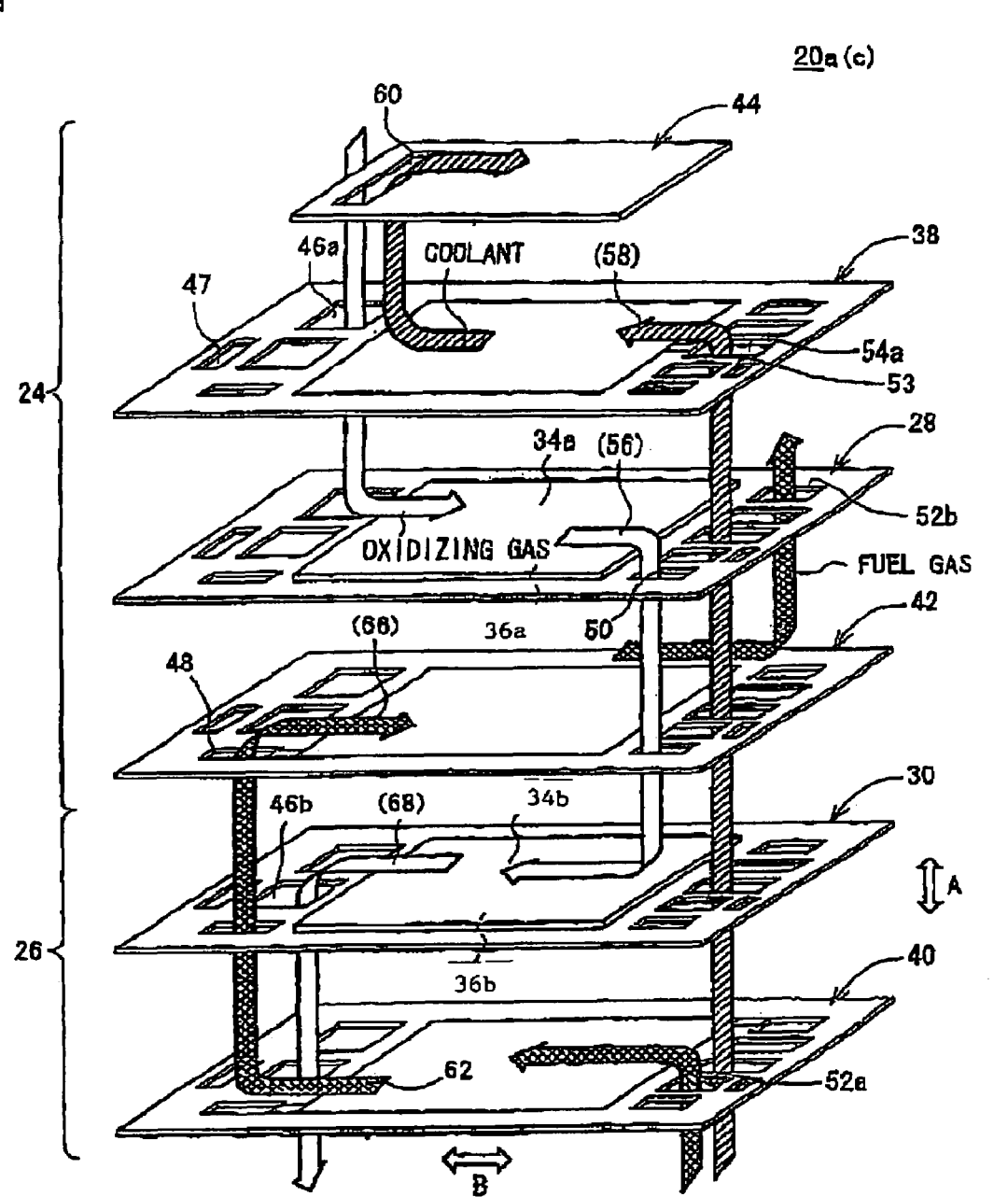
FIG. 3 is a view illustrating the flows of an oxidizing gas, a fuel gas, and a coolant in the cell assembly shown in FIG. 2.

As shown in FIGS. 2 and 3, a first separator 38 is disposed on the cathode electrode 34a side of the first unified body 28, and a second separator 46 is disposed on the anode 36b side of the second unified body 30. An intermediate separator 42 is disposed between the first and second unified bodies 28 and 30. A thin wall plate 44 is provided on the outer side of each of the first and second separators 38 and 40.

As shown in FIG. 2, each of the first and second unified bodies 28 and 30, the first and second separators 38 and 40, and the intermediate separator 42 has, at its one edge portion in the long-side direction, an oxidizing gas supply passage hole (reaction gas supply passage hole) 46a, an oxidizing gas discharge passage hole (reaction gas discharge passage hole) 46b, a low humidity oxidizing gas supply passage hole (additional reaction gas supply passage hole) 47, and a fuel gas intermediate communication hole 48. Each of the oxidizing gas supply passage hole 46a and the oxidizing gas discharge passage hole 46b allows an oxidizing gas (reaction gas) such as an oxygen containing gas or air to pass therethrough. The low humidity oxidizing gas supply passage hole 47 allows an oxidizing gas having a humidity lower than that of a humidified oxidizing gas supplied to the oxidizing gas supply passage hole 46a to pass therethrough. The fuel gas intermediate communication hole 48 allows a fuel gas (reaction gas) such as a hydrogen containing, gas to pass therethrough. The oxidizing gas supply passage holes 46a (oxidizing gas discharge passage holes 46b, low humidity oxidizing gas supply passage holes 47, and fuel gas intermediate communication holes 48) provided in the cell components 28, 30, 38, 40 and 42 are communicated to each other in the stacking direction (shown by the arrow A) of the first and second unit cells 24 and 26.

Each of the first and second unified bodies 28 and 30, the first and second separators 38 and 40, and the intermediate separator 42 has, at the other edge portion in the long-side direction, an oxidizing gas intermediate communication hole 50, a fuel gas supply passage hole (reaction gas supply passage hole) 52a, a fuel gas discharge passage hole (reaction gas discharge passage hole) 52b, a low humidity fuel gas supply passage hole (additional reaction gas supply passage hole) 53, a coolant supply passage hole 54a, and a coolant discharge passage hole 54b. The oxidizing gas intermediate communication hole 50 allows an oxidizing gas to pass therethrough.

Each of the fuel gas supply passage hole 52a and the fuel gas discharge passage hole 52b allows a fuel gas to pass therethrough. The low humidity fuel gas supply passage hole 53 allows a fuel gas having a humidity lower than that of a humidified fuel gas supplied to the fuel gas supply passage hole 52a to pass therethrough. Each of the coolant supply passage hole 54a and the coolant discharge passage hole 54b allows a coolant to pass therethrough. The oxidizing gas intermediate communication holes 50 (fuel gas supply passage holes 52a, fuel gas discharge passage holes 52b, low humidity fuel gas supply passage holes 53, coolant supply passage holes 54a, and coolant discharge passage holes 54b) provided in the cell components 28, 30, 38, 40 and 42 are communicated to each other in the direction A.

Figure 4:
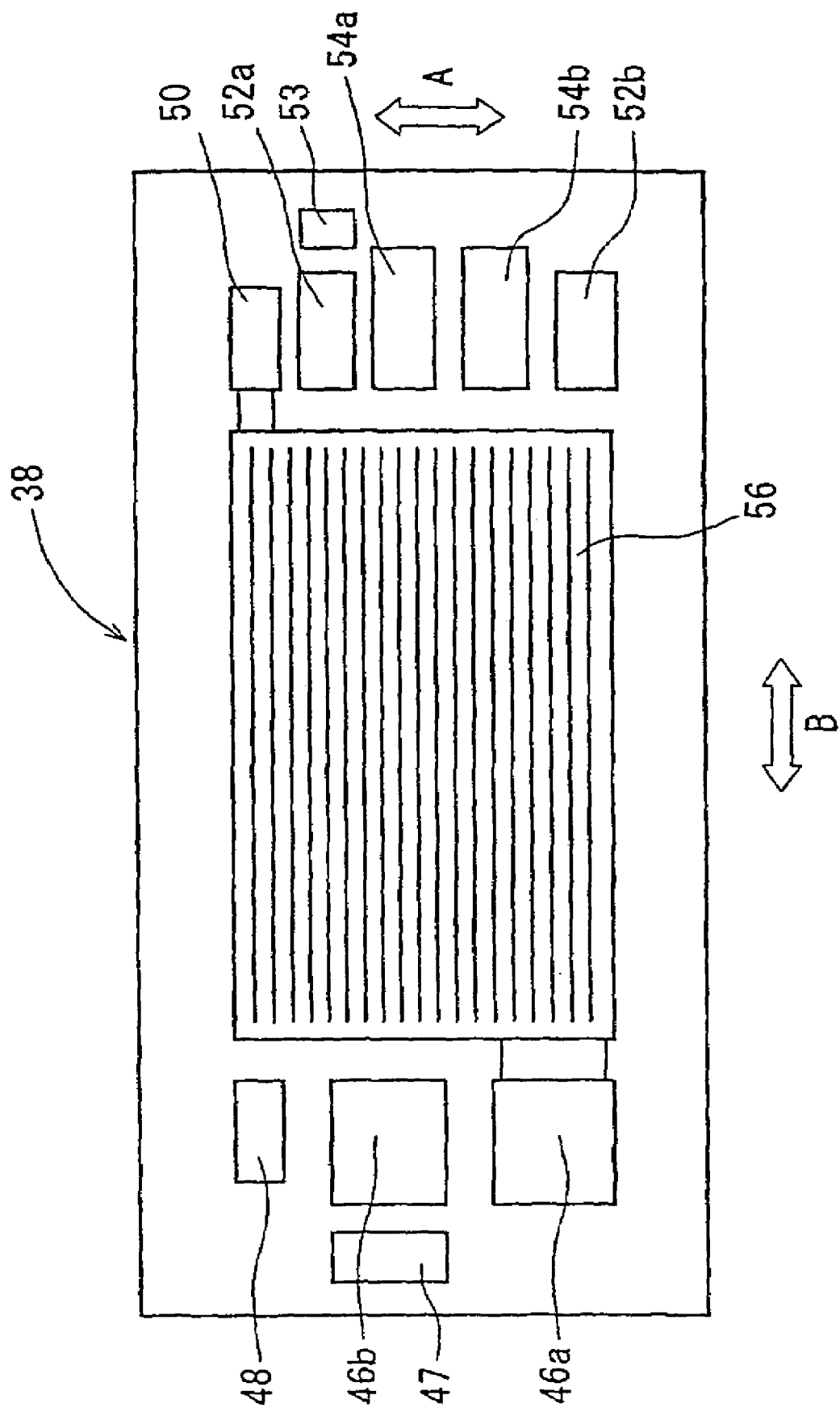
FIG. 4 is a front view of a first separator of the cell assembly shown in FIG. 2.

The first separator 38 is formed of a metal thin plate. The surface, facing to the reaction plane (electric power generation plane) of the first unified body 28, of the first separator 38 is formed into a shape of projections and depressions, for example, a corrugated shape. As shown in FIG. 4, the first separator 38 has, on the side facing to the cathode 34a of the first unified body 28, a plurality of oxidizing gas passages (reaction passages) 56 linearly extending in the long-side direction (shown by an arrow B). The one-ends of the oxidizing gas passages 56 are communicated to the oxidizing gas supply passage hole 46a and the other ends thereof are communicated to the oxidizing gas intermediate communication hole 50.

As shown in FIGS. 2 and 3, the first separator 38 has, on the side facing to one surface of the wall plate 44, a plurality of coolant passages 58 linearly extending in the long-side direction B. The one-ends of the coolant passages 58 are communicated to the coolant supply passage hole 54a, and the other ends thereof are communicated to the coolant discharge passage hole 54b by way of the other surface side of the wall plate 44 via a hole portion 60 as an intermediate return portion formed in the wall plate 44 or formed in a separate member.

The second separator 40 is configured as being substantially similar to the first separator 38. The second separator 40 has, on the side facing to the anode 36b of the second unified body 30, a plurality of fuel gas passages (reaction gas passages) 62 linearly extending in the long-side direction B. The one-ends of the fuel gas passages 62 are communicated to the fuel gas intermediate communication hole 48 and the other ends thereof are communicated to the fuel gas discharge passage hole 52b.

The intermediate separator 42 is configured as being substantially similar to each of the first and second separators 38 and 40. The intermediate separator 42 has, on the side facing to the anode 36a of the first unified body 28, a plurality of fuel gas passages (reaction gas passages) 66 linearly extending in the long-side direction B. The one-ends of the fuel gas passages 66 are communicated to the fuel gas discharge passage hole 52b and the other ends thereof are communicated to the fuel gas intermediate communication hole 48.

As shown in FIG. 3, the intermediate separator 42 has, on the side facing to the cathode 34b of the second unified body 30, a plurality of oxidizing gas passages (reaction gas passages) 68 linearly extending in the long-side direction B. The one-ends of the oxidizing gas passages 68 are communicated to the oxidizing gas intermediate communication hole 50 and the other ends thereof are communicated to the oxidizing gas discharge passage hole 46b.

Figure 5:
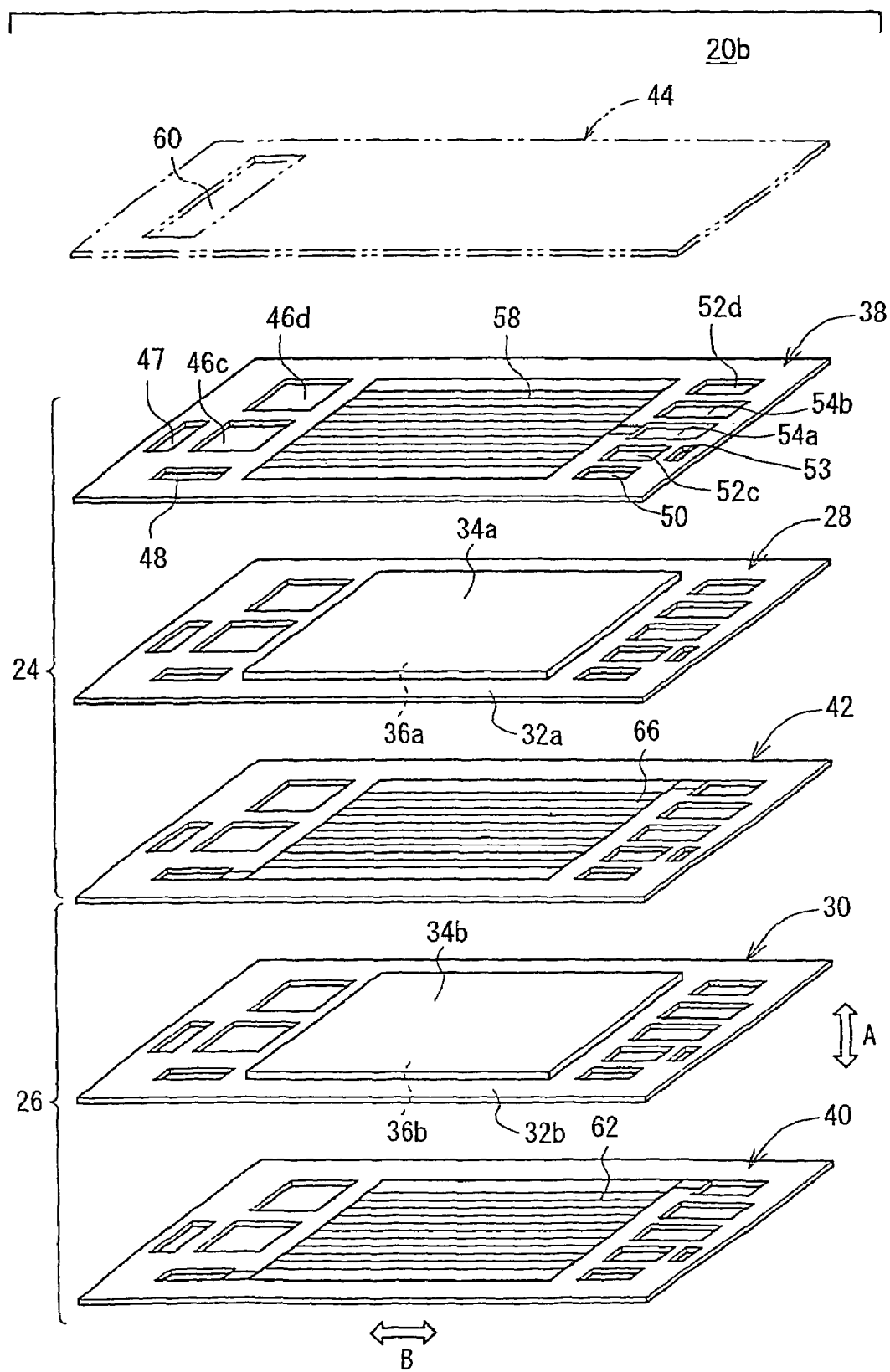
FIG. 5 is an exploded perspective view of another cell assembly of the fuel cell stack shown in FIG. 1.

As shown in FIG. 5, the cell assembly 20b is configured as being substantially similar to each of the cell assemblies 20a and 20c. In the cell assembly 20b, parts corresponding to those shown in each of the cell assemblies 20a and 20c are designated by the same reference numerals and the overlapped description thereof is omitted.

Figure 6:
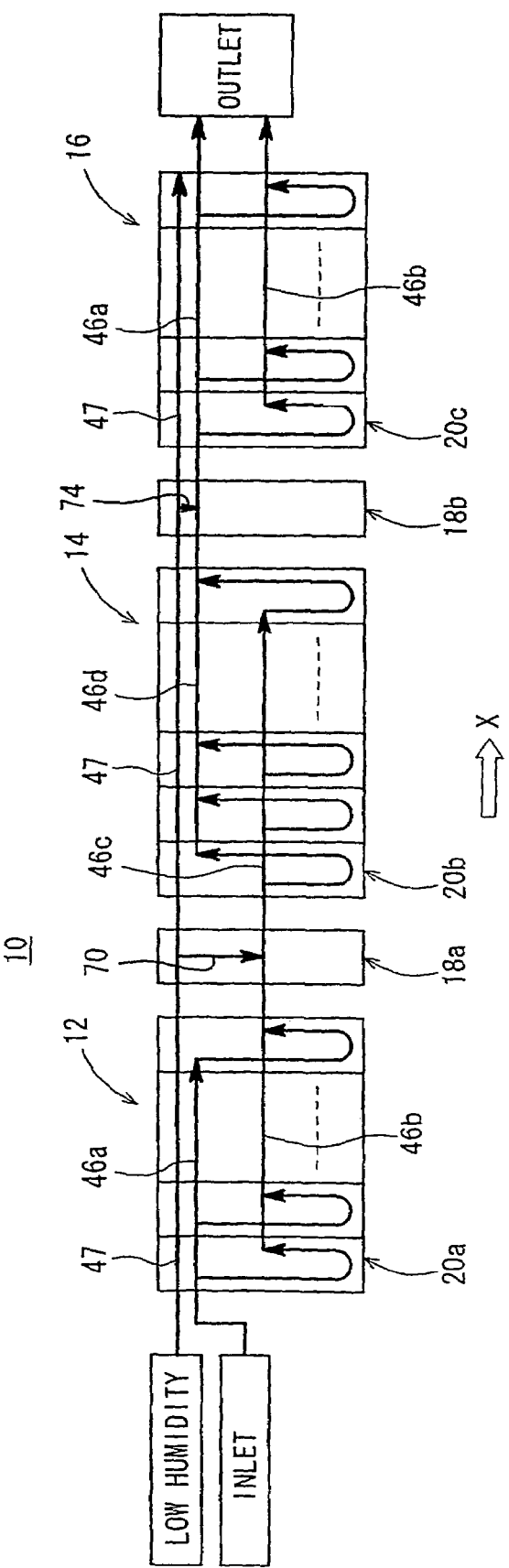
FIG. 6 is a view illustrating the flow of an oxidizing gas in the fuel cell stack shown in FIG. 1.

The cell assembly 20b has oxidizing gas supply passage holes (reaction gas supply passage holes) 46c and oxidizing gas discharge passage holes (reaction gas discharge passage holes) 46d. The oxidizing gas supply passage holes 46c are communicated in series to the oxidizing gas discharge passage holes 46b of the cell assembly 20a, and the oxidizing gas discharge passage holes 46d are communicated in series to the oxidizing gas supply passage holes 46a of the cell assembly 20c As shown in FIG. 6, a low humidity oxidizing gas is supplied to the low humidity oxidizing gas supply passage holes 47 formed in the cell assemblies 20a, 20b and 20c, and is supplied to the oxidizing gas supply passage holes 46c of the cell assembly 20b via a connection path (communication portion) 70 of the intermediate plate 18a, and is also supplied to the oxidizing gas supply passage holes 46a of the cell assembly 20c via a connection path (communication portion) 74 of the intermediate plate 18b.

Similarly, the cell assembly 20b has fuel gas supply passage holes (reaction gas supply passage holes) 52c and fuel gas discharge passage holes (reaction gas discharge passage holes) 52d. The fuel gas supply passage holes 52c are communicated in series to the fuel gas discharge passage holes 52b of the cell assembly 20c, and the fuel gas discharge passage holes 52d are communicated in series to the fuel gas supply passage holes 52a of the cell assembly 20a.

Figure 7:
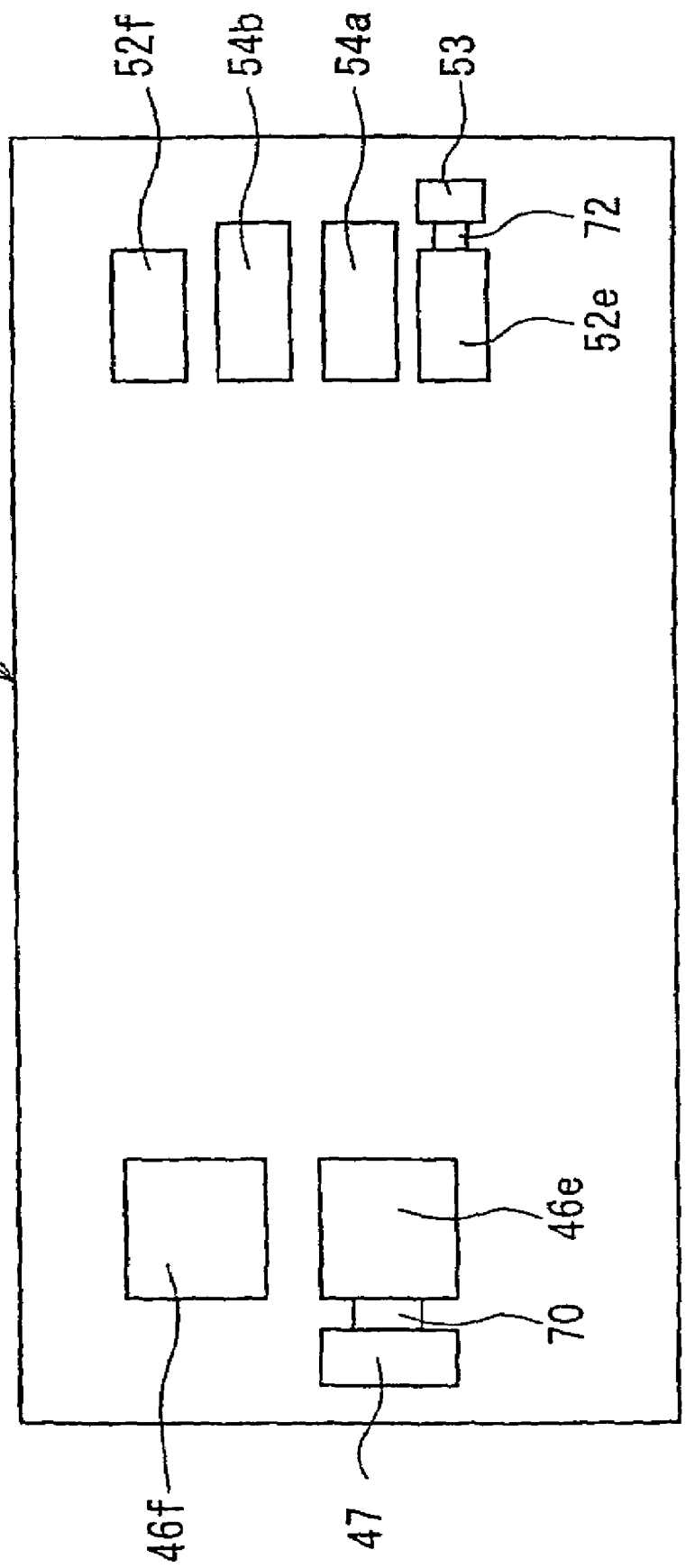
FIG. 7 is a front view of one intermediate plate shown in FIG. 1.

As shown in FIG. 7, the intermediate plate 18a has, at one edge portion in the long-side direction, oxidizing gas supply passage holes 0.46e and 46f and a low humidity oxidizing gas supply passage hole 47. The oxidizing gas supply passage hole 46e, which is communicated to the oxidizing gas discharge passage holes 46b of the cell assembly 20a and the oxidizing gas supply passage holes 46c of the cell assembly 20b, is communicated to the low humidity oxidizing gas supply passage hole 47 via the connection path 70.

The intermediate plate 18a has, at the other edge portion in the long-side direction, a coolant supply passage hole 54a, a coolant discharge passage hole 54b, a low humidity fuel gas supply passage hole 53, and fuel gas passage holes 52e and 52f. The fuel gas passage hole 52e, which is communicated to the fuel gas supply passage holes 52a of the cell assembly 20a, is communicated to the low humidity fuel gas supply passage hole 53 via a connection path (communication portion) 72.

Figure 8:
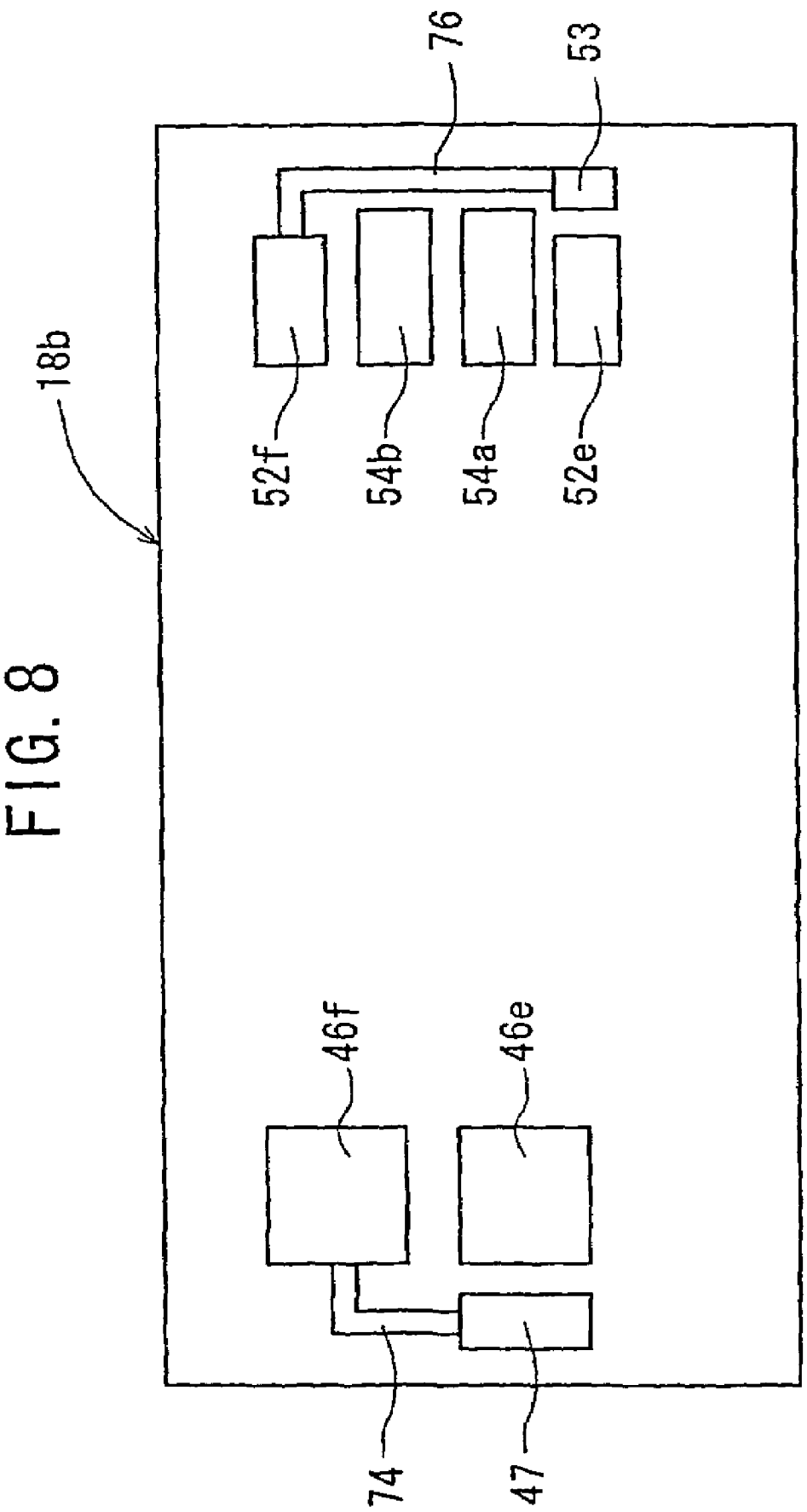
FIG. 8 is a front view of another intermediate plate shown in FIG. 1.

As shown in FIG. 8, the intermediate plate 18b is configured as being substantially similar to the intermediate plate 18a. An oxidizing gas supply passage hole 46f communicated to the oxidizing gas supply passage holes 46a of the cell assembly 20c is communicated to a low humidity oxidizing gas supply passage hole 47 via a connection path (communication portion) 74, while a fuel gas passage hole 52f communicated to the fuel gas supply passage holes 52c of the cell assembly 20b is communicated to a low humidity fuel gas supply passage hole 53 via a connection path (communication portion) 76.

Figure 9:
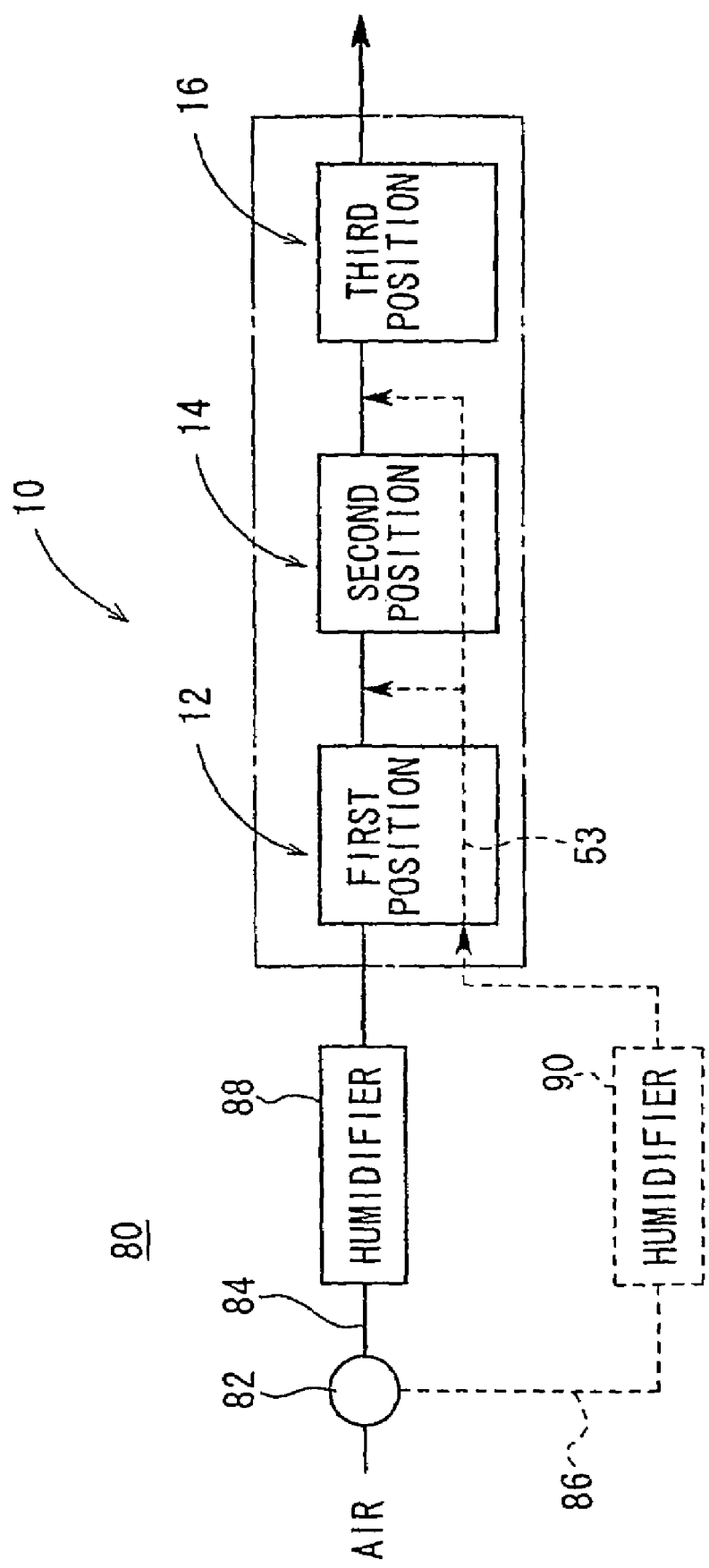
FIG. 9 is a schematic diagram of a configuration of a fuel cell system in which the fuel cell stack shown in FIG. 1 is assembled.

FIG. 9 is a schematic diagram of a configuration of a fuel cell system 80 in which the fuel cell stack 10 configured as described above is assembled.

The fuel cell system 80 includes a compressor 82 for compressing atmospheric air and supplying the compressed air to the fuel cell stack 10. A main supply line 84 and an additional supply line 86 are communicated to the outlet side of the compressor 82. The main supply line 84 is communicated to the oxidizing gas supply passage holes 46a of the first sub-stack 12 via a humidifier 88, and the additional supply line 86 is communicated to the low humidity oxidizing gas supply passage holes 47 via a humidifier 90. The humidifier 90 may be configured to have a relatively small humidifying ability, and further, it may be provided as needed.

The operation of the fuel cell stack 10 having the above configuration will be described in relation to an operating method of the present invention.

As shown in FIG. 9, an oxidizing gas such as air or an oxygen containing gas is press-fed in the main supply line 84 by operation of the compressor 82 of the fuel cell system 80. The humidity of the oxidizing gas thus press-fed is adjusted to a specific value in the humidifier 88. The oxidizing gas is then supplied in the fuel cell stack 10. On the other hand, a fuel gas such as a hydrogen containing gas is, after adjustment of the humidity to a specific value, supplied in the fuel cell stack 10 in the direction opposite to the flow direction of the oxidizing gas by a supply mechanism (not shown).

In the fuel cell stack 10, the oxidizing gas is supplied in the oxidizing gas supply passage holes 46a of the cell assemblies 20a constituting the first sub-stack 12, while the fuel gas is supplied to the fuel gas supply passage holes 52a of the cell assemblies 20c constituting the third sub-stack 16 (see FIG. 1). Further, a coolant such as pure water, ethylene glycol, or oil is supplied in the coolant supply passage holes 54a.

As a result, in the first unified body 28, the oxidizing gas supplied to the cathode 34a and the fuel gas supplied to the anode 36a are consumed by catalytic reaction occurring in the catalyst layers, to perform electric power generation, and in the second unified body 30, the oxidizing gas supplied to the cathode 34b and the fuel gas supplied to the anode 36b are consumed by catalytic reaction occurring in the catalyst layers, to perform electric power generation (see FIG. 3).

In this case, according to the first embodiment, the oxidizing gas with moisture in an amount necessary for operation of the first sub-stack 12 (more specifically, the previously humidified oxidizing gas in a specific amount) is supplied in the first sub-stack 12. As a result, the humidified oxidizing gas in an amount necessary for reaction is supplied in the cell assemblies constituting the first sub-stack 12, it is possible to effectively perform desired reaction (electric power generation) in the first sub-stack 12.

Water is produced in the cell assemblies 20a. The produced water is moved in the direction X through the oxidizing gas discharge passage holes 46b of the cell assemblies 20a and is introduced in the oxidizing gas supply passage holes 46c of the cell assemblies 20b constituting the second sub-stack 14. In this case, as described above, the intermediate plate 18a is interposed between the first and second sub-stacks 12 and 14. In the intermediate plate 18a, the oxidizing gas supply passage hole 46e communicated to the oxidizing gas discharge passage holes 46b of the cell assemblies 20a is communicated to the low humidity oxidizing gas supply passage hole 47 via the connection path 70.

Accordingly, a low humidity oxidizing gas is supplied in the oxidizing gas supply passage hole 46e via the additional supply line 86. The low humidity oxidizing gas is humidified by the produced water moved through the oxidizing gas discharge passage holes 46b of the cell assemblies 20a, and is supplied in the oxidizing gas supply passage holes 46c of the cell assemblies 20b. As a result, in the second sub-stack 14, the humidified oxidizing gas is positively supplied to each cell assembly 20b, to perform desired reaction.

Water is produced by reaction in the cell assemblies 20b and is discharged in the oxidizing gas discharge passage holes 46d. In this case, as described above, in the intermediate plate 18b, the oxidizing gas supply passage holes 46a of the third sub-stack 16 is communicated to the low humidity oxidizing gas supply passage hole 47 via the connection path 74. As a result, the low humidity oxidizing gas is sufficiently humidified by the produced water and is supplied in the oxidizing gas supply passage holes 46a of the third sub-stack 16.

Meanwhile, like the above-described oxidizing gas, a fuel gas humidified with water in an amount necessary for operation of the third sub-stack 16 (more specifically, a previously humidified fuel gas in a specific amount) is supplied in the third sub-stack 16. Water previously contained in the fuel gas for humidification is discharged in the fuel gas discharge passage holes 52b as it is in each of the first and second unified bodies 28 and 30, and is moved in the second sub-stack 14, to humidify a low humidity fuel gas supplied from the low humidity fuel gas supply passage holes 5-3. The low humidity fuel gas thus humidified is then supplied in the second sub-stack 14.

According to the first embodiment, it is sufficient to supply only water in an amount used for humidifying the oxidizing gas necessary for reaction in the first sub-stack 12, and to supply only water in an amount used for humidifying the fuel gas necessary for reaction in the third sub-stack 16. In practice, according to the first embodiment, the amount of water used for humidifying a fuel gas can be reduced by 62% as compared with the amount of water which has been necessary in the related art fuel stack operation. As a result, it is possible to significantly reduce the amount of water supplied in the whole fuel cell stack 10 for humidification, and hence to significantly miniaturize a humidifying structure.

Figure 10:
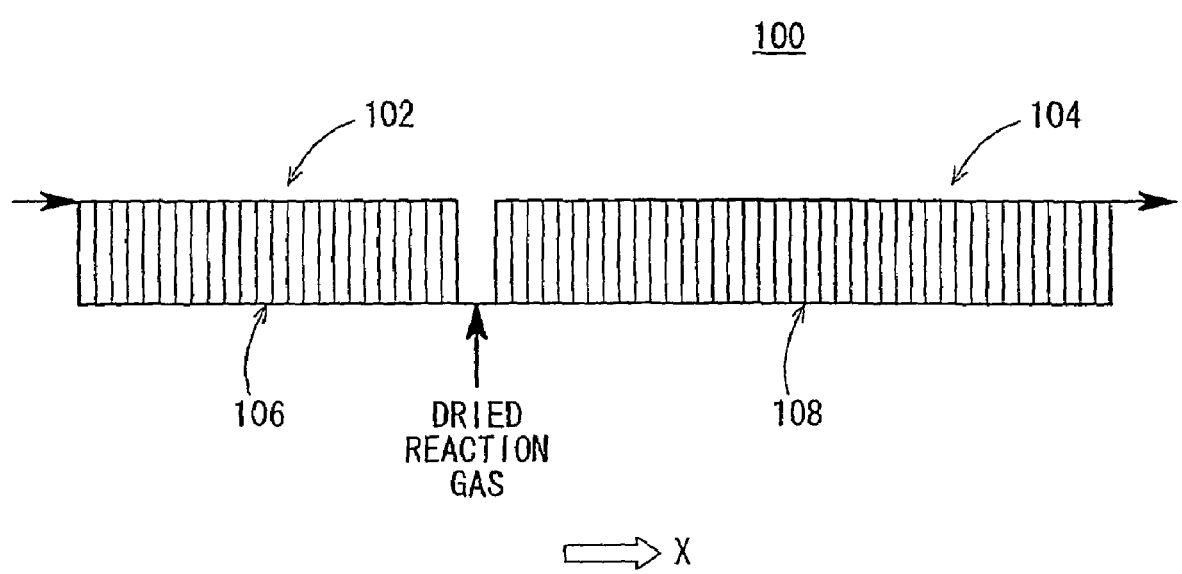
FIG. 10 is a schematic diagram of a configuration of a fuel cell stack according to a second embodiment of the present invention.

FIG. 10 is a schematic diagram of a configuration of a fuel cell stack 100 according to a second embodiment of the present invention. In the fuel cell stack 100, parts corresponding to those shown in the fuel cell stack 10 according to the first embodiment are designated by the same reference numerals and the overlapped description thereof is omitted.

The fuel cell stack 100 includes a first sub-stack 102 and a second sub-stack 104. The first sub-stack 102 has a specific number, for example, 78 pieces of unit cells 106 stacked to each other in the flow direction (shown by an arrow X), and the second sub-stack 104 has a specific number, for example, 122 pieces of unit cells 108 stacked to each other in the flow direction X. To supply a low humidity oxidizing gas and a low humidity fuel gas in the second sub-stack 104 (or first sub-stack 102), low humidity reaction gas supply passage holes (not shown) are provided between the first and second sub-stacks 102 and 104. Further, oxidizing gas passage holes are communicated in series to each other and fuel gas passage holes are communicated in series to each other between the first and second sub-stacks 102 and 104.

Figure 11:
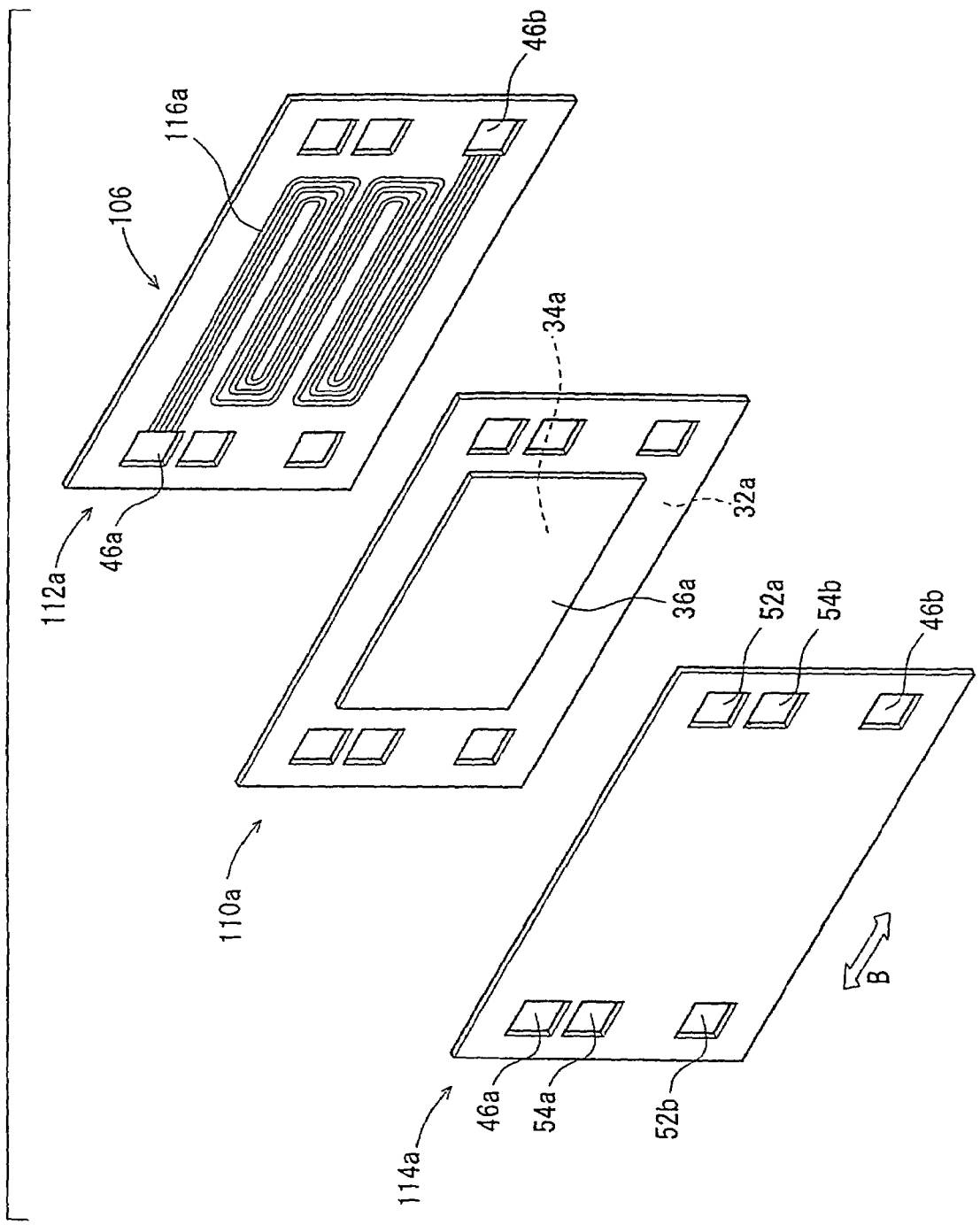
FIG. 11 is an exploded perspective view of one unit cell.

As shown in FIG. 11, the unit cell 106 includes a unified body 110a, and a first separator 112a and a second separator 114a disposed with the unified body 110a put therebetween. The unit cell 106 has, on the one edge side in the long-side direction (shown by an arrow B), oxidizing gas supply passage holes 46a, coolant supply passage holes 54a, and fuel gas discharge passage holes 52b, and also has, on the other edge side in the long-side direction, fuel gas supply passage holes 52a, coolant discharge passage holes 54b, and oxidizing gas discharge passage holes 46b.

The first separator 112a has, in the surface facing to a cathode 34a, a plurality of oxidizing gas passages 116a. The oxidizing gas supply passages 116a are, at the one-ends thereof, communicated to the oxidizing gas supply passage hole 46a, meandering in such a manner as to repeatedly reciprocate in the long-side direction, and are, at the other ends thereof, communicated to the oxidizing gas discharge passage hole 46b. Like the first separator 112a, the second separator 114a has, in the surface facing to an anode 36a side, meandering fuel gas passages (not shown) communicated at the one-ends to the fuel gas supply passage hole 52a and also communicated at the other ends to the fuel gas discharge passage hole 52b.

Figure 12:
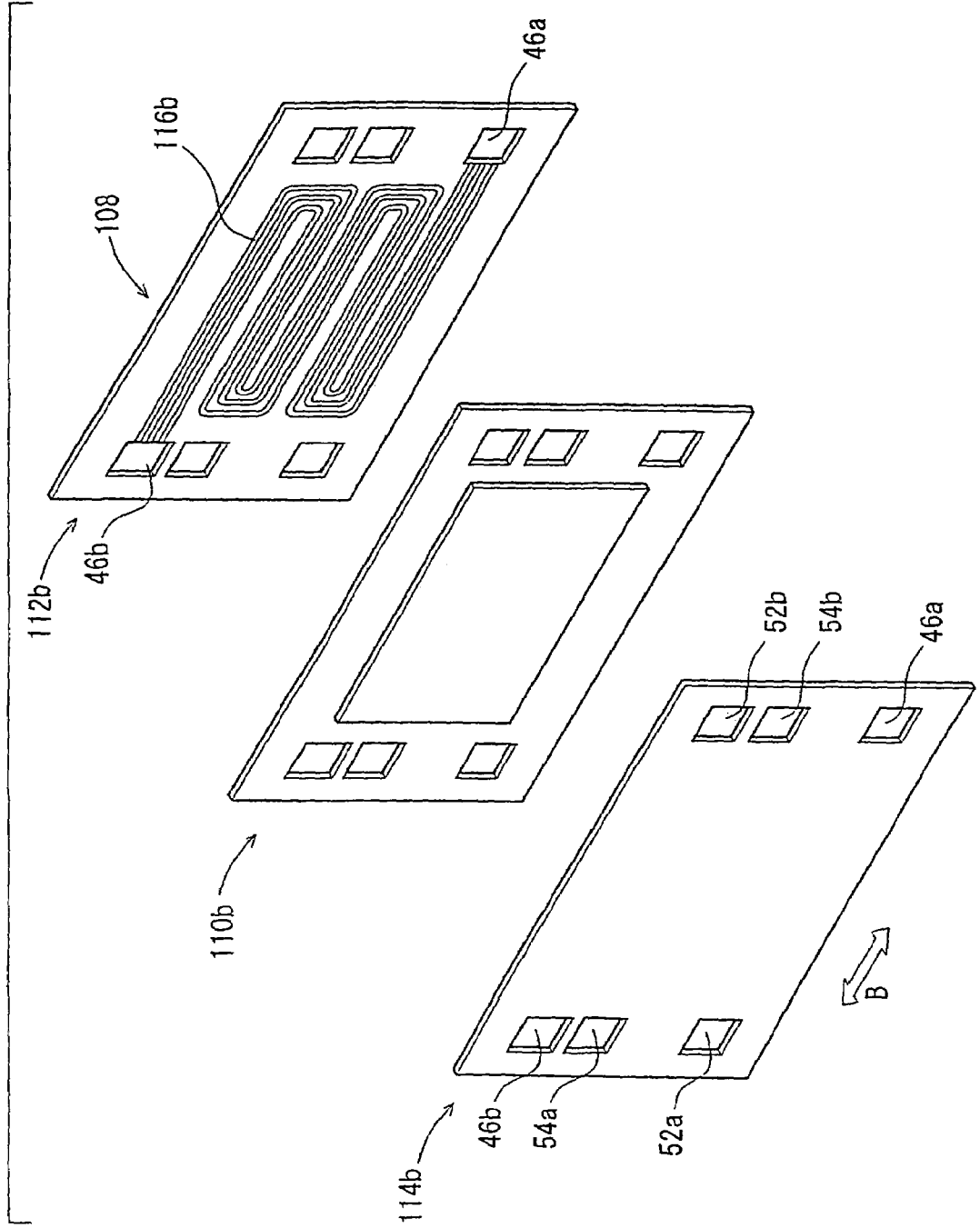
FIG. 12 is an exploded perspective view of another unit cell.

As shown in FIG. 12, the unit cell 108 includes a unified body 110b, and a first separator 112b and a second separator 114b. The unit cell 108 has oxidizing gas supply passage holes 46a, oxidizing gas discharge passage holes 46b, fuel gas supply passage holes 52a, and fuel gas discharge passage holes 52b, which are located at positions opposed to those of the oxidizing gas supply passage holes 46a, the oxidizing gas discharge passage holes 46b, the fuel gas supply passage holes 52a, and the fuel gas discharge passage holes 52b of the unit cell 106, respectively. Oxidizing gas passages 116b provided in the first separator 112b meander from the oxidizing gas supply passage hole 46a to the oxidizing gas discharge passage hole 46b.

The operation of the fuel cell stack 100 having the above configuration will be described below. It is to be noted that the description will be made only with regard to the oxidizing gas side.

An oxidizing gas in an amount necessary for operation of the first sub-stack 102 (78 cells) is supplied in the first sub-stack 102 in a state being previously humidified. In the first sub-stack 102, the inlet side humidity of the oxidizing gas is set to 65%; the utilization ratio of the oxidizing gas is set to 0.5; and the partial pressure of oxygen is set to 36 kPa.

In the first sub-stack 102, the oxidizing gas is supplied in the oxidizing gas passages 116a of the first separator 112a, and is consumed by the cathode 34a while meandering to the oxidizing gas discharge passage hole 46b, to thereby perform electric power generation. At this time, water is produced by reaction, and the produced water is discharged in the oxidizing gas discharge passage hole 46b. The produced water is introduced in the oxidizing gas supply passage holes 46a, communicated to the oxidizing gas discharge passage holes 46b of the first sub-stack 102, of the second sub-stack 104 and simultaneously a low humidity oxidizing gas is supplied in the oxidizing gas supply passage holes 46a via the low humidity oxidizing gas supply passage holes (not shown).

Here, the flow rate of the low humidity oxidizing gas is set to a value necessary for reaction in 85 pieces of the cells, and the utilization ratio of the low humidity oxidizing gas is set to 1/1.4. The low humidity oxidizing gas thus humidified by the produced water is supplied in the second sub-stack 104. In the second sub-stack 104, the inlet side humidity of the oxidizing gas is set to 65%; the utilization ratio of the oxidizing gas is set to 0.5; and the partial pressure of oxygen is set to 26 kPa.

According to the second embodiment, it is possible to desirably humidify the whole fuel cell stack 100 (200 cells) only by supplying the amount of water necessary for humidifying 78 pieces of the cells, and hence to easily miniaturize the humidifying structure. Further, it is possible to operate 200 pieces of the cells with the total utilization ratio of 1/1.63, and hence to effectively improve the utilization ratio.

Figure 13:
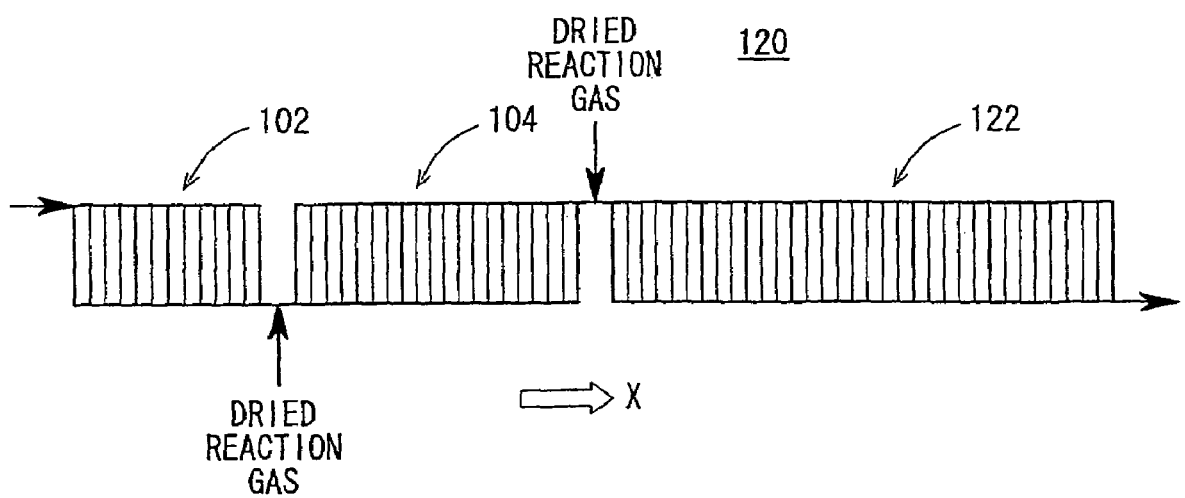
FIG. 13 is a schematic diagram of a configuration of a fuel cell stack according to a third embodiment of the present invention.

FIG. 13 is a schematic diagram of a configuration of a fuel cell stack 120 according to a third embodiment of the present invention. In the fuel cell stack 120, parts corresponding to those shown in the fuel cell stack 100 according to the second embodiment are designated by the same reference numerals and the overlapped description is omitted.

The fuel cell stack 120 includes a first sub-stack 102, a second sub-stack 104, and a third sub-stack 122. The first sub-stack 102 has a specific number, for example, 41 pieces of unit cells 106 stacked to each other in the direction X; the second sub-stack 104 has a specific number, for example, 65 pieces of unit cells 108 stacked to each other in the direction X; and the third sub-stack 122 has a specific number, for example, 94 pieces of unit cells 106 stacked to each other in the direction X. Intermediate plates (not shown) for supplying a low humidity oxidizing gas and a fuel gas to supply passage holes are interposed between the first and second sub-stacks 102 and 104 and between the second and third sub-stacks 104 and 122, and further, oxidizing gas passage holes are communicated in series to each other and fuel gas passage holes are also communicated in series to each other between adjacent two of the first, second and third sub-stacks 102, 104 and 122.

In the fuel cell stack 120, an oxidizing gas in an amount necessary for operating the first sub-stack 102 (41 cells) is supplied in the first sub-stack 102 in a state being previously humidified. In the first sub-stack 102, the inlet side humidity of the oxidizing gas is set to 65%; the utilization ratio of the oxidizing gas is set to 0.5; and the partial pressure of oxygen is set to 36 kPa.

Subsequently, a low humidity oxidizing gas in an amount necessary for reaction in 46 pieces of the cells is supplied in the second sub-stack 104 (utilization ratio: 1/1.4). The low humidity oxidizing gas is humidified by the produced water discharged from the first sub-stack 102 and is introduced in the second sub-stack 104. Further, a low humidity oxidizing gas in an amount necessary for reaction in 61 pieces of the cells is supplied in the third sub-stack 122 (utilization ratio: 1/1.3).

In the second sub-stack 104, the inlet side humidity of the oxidizing gas is set to 65%; the utilization ratio of the oxidizing gas is set to 0.5; and the partial pressure of oxygen is set to 26 kPa. In the third sub-stack 122, the inlet side humidity of the oxidizing gas is set to 65%; the utilization ratio of the oxidizing gas is set to 0.5; and the partial pressure of oxygen is set to 21 kPa.

According to the third embodiment, it is possible to desirably humidify the whole fuel cell stack 120 (200 cells) only by supplying water in an amount used for humidifying 41 pieces of the cells, and to operate 200 pieces of the cells with the total utilization ratio of 1/1.47. As a result, it is possible to obtain an effect similar to that obtained by the second embodiment.

Figure 14:
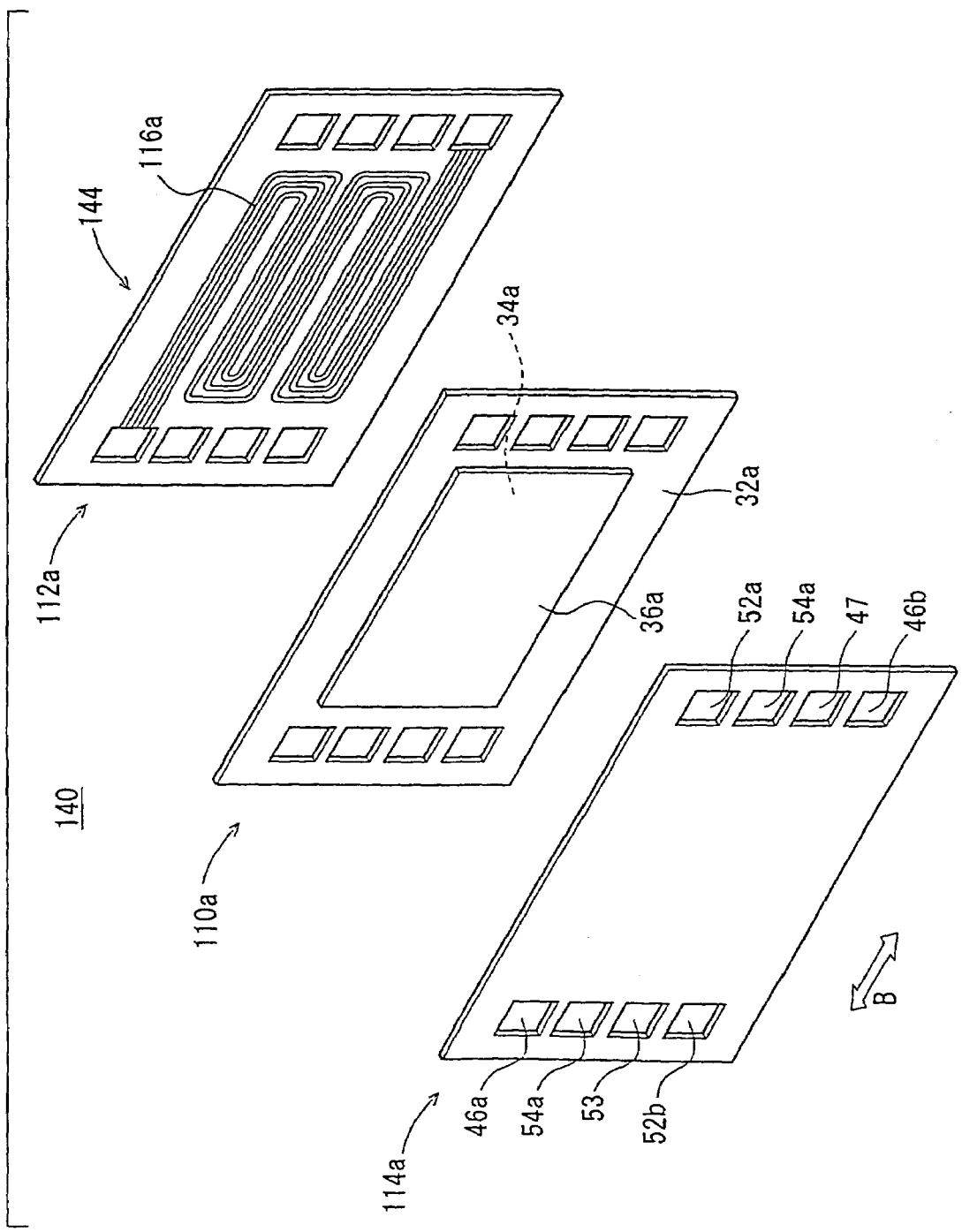
FIG. 14 is an exploded perspective view of an essential portion of a first sub-stack of a fuel cell stack according to a fourth embodiment of the present invention.
Figure 15:
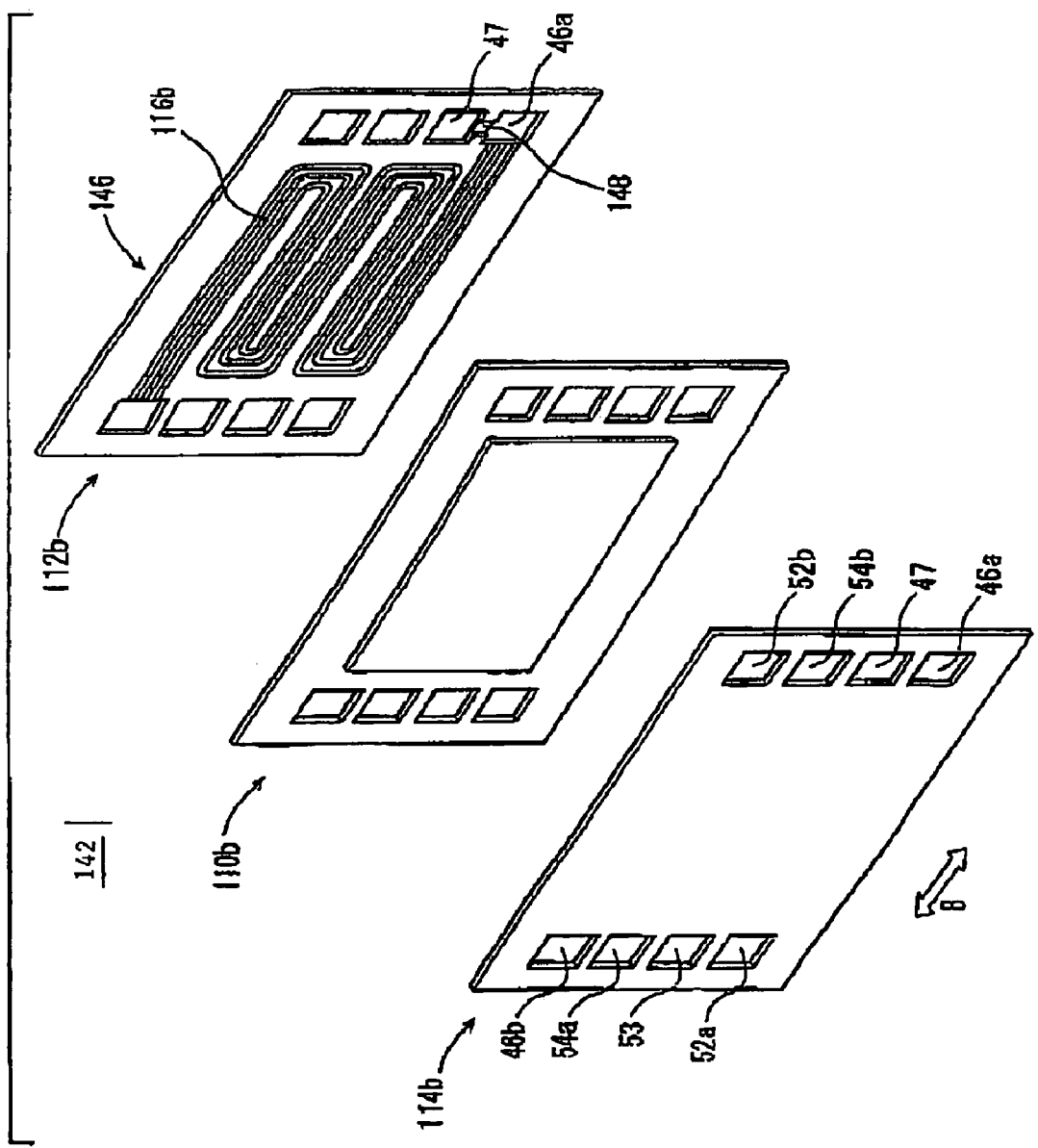
FIG. 15 is an exploded perspective view of an essential portion of a second sub-stack of the fuel cell stack shown in FIG. 14.

FIG. 14 is a exploded perspective view of an essential portion of a first sub-stack 140 disposed on the upstream side of a fuel cell stack according to a fourth embodiment of the present invention; and FIG. 15 is an exploded perspective view of a second sub-stack 142 disposed on the downstream side of the fuel cell stack shown in FIG. 14. In the first and second sub-stacks 140 and 142, parts corresponding to those shown in the sub-stacks of the fuel cell stack 100 according to the second embodiment are designated by the same reference numerals and the overlapped description thereof is omitted.

As shown in FIG. 14, the first sub-stack 140 includes a unit cell 144. The unit cell 144 has, on the one edge side in the long-side direction (shown by an arrow B), oxidizing gas supply passage holes 46a, coolant supply passage holes 54a, low humidity fuel gas supply passage holes 53, and fuel gas discharge passage holes 52b, and also has, on the other edge side in the long-side direction B, fuel gas supply passage holes 52a, coolant discharge passage holes 54b, low humidity oxidizing gas supply passage holes 47, and oxidizing gas discharge passage holes 46b.

As shown in FIG. 15, the second sub-stack 142 includes a unit cell 146. In this unit cell 146, oxidizing gas supply passage holes 46a are communicated to low humidity oxidizing gas passage holes 47 via connection paths (mixing portions) 148.

According to the fourth embodiment configured as described above, in each of the cells 146 constituting the second sub-stack 142, a low humidity oxidizing gas is supplied from the low humidity oxidizing gas supply passage holes 47 into the oxidizing gas supply passage holes 46a via the connection paths 148. The low humidity oxidizing gas, after humidified by the produced water discharged from the first sub-stack 140, is supplied in oxidizing gas passages 116b.

Accordingly, in the second sub-stack 142, since the low humidity oxidizing gas or a non-humidified oxidizing gas is supplied in each unit cell 146, it is possible to significantly reduce the amount of water used for humidifying the whole fuel cell stack, and hence to obtain an effect similar to those obtained in the first, second, and third embodiments.

Figure 16:
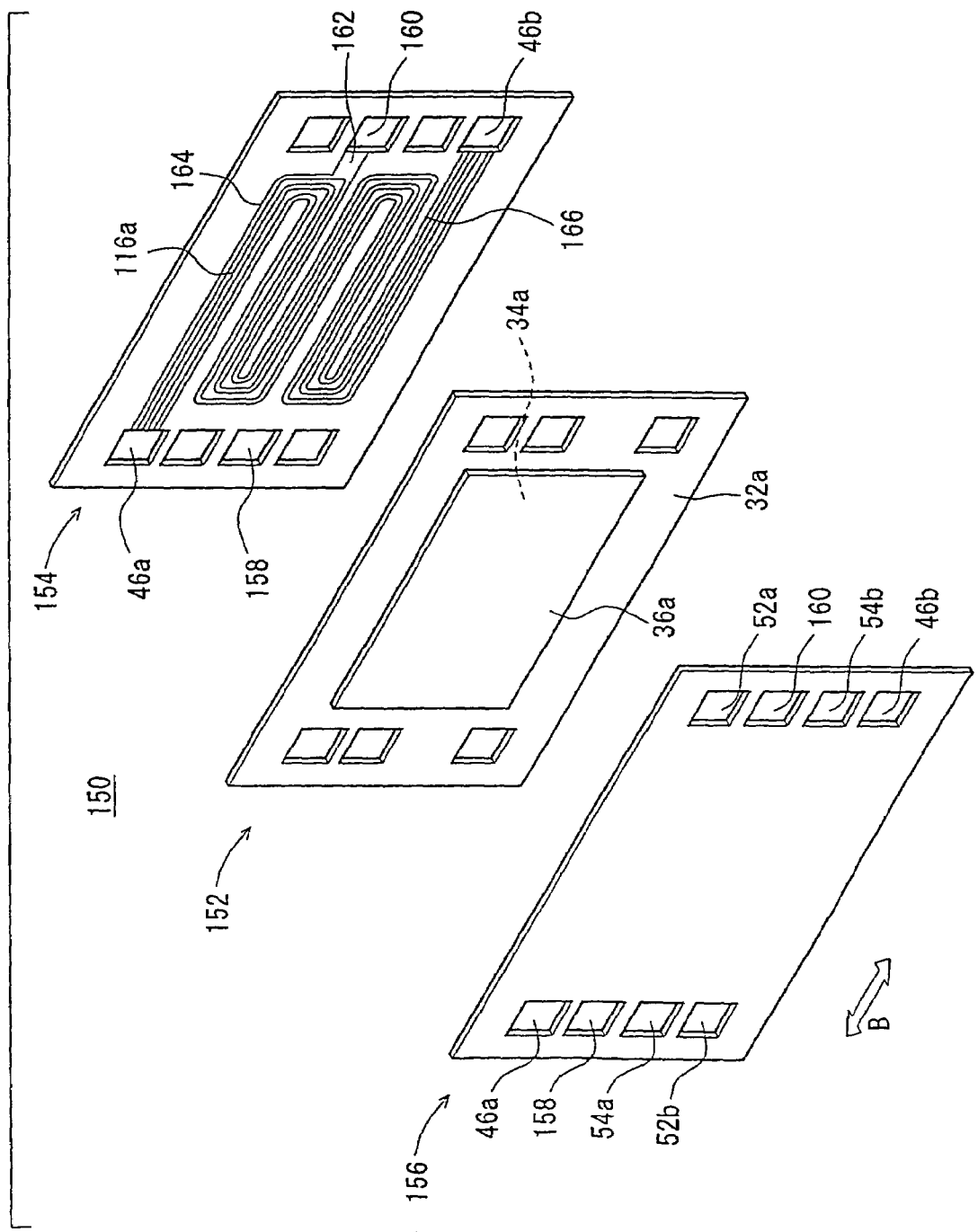
FIG. 16 is an exploded perspective view of an essential portion of a unit cell of a fuel cell stack according to a fifth embodiment of the present invention.

In the first to fourth embodiments, a low humidity oxidizing gas is supplied in each sub-stack or in each cell; however, such a configuration may be replaced with a configuration that each reaction plane is divided into two parts, and a low humidity oxidizing gas can be supplied in one of the divided parts of the reaction plane. This will be described in the following fifth embodiment of the present invention. FIG. 16 is an exploded perspective view of an essential portion of a unit cell 150 of a fuel cell stack according to the fifth embodiment of the present invention. In the unit cell 150, parts corresponding to those shown in the unit cell 106 of the fuel cell stack 100 according to the second embodiment shown in FIG. 10 are designated by the same reference numerals and the overlapped description is omitted.

The unit cell 150 includes a unified body 152, and a first separator 154 and a second separator 156 disposed with the unified body 152 put therebetween. The unit cell 150 has, on the one edge side in the long-side direction (shown by an arrow B), oxidizing gas supply passage holes 46a, low humidity fuel gas supply passage holes (additional reaction gas supply passage holes) 158, coolant supply passage holes 54a, and fuel gas discharge passage holes 52b, and has, on the other side in the long-side direction, fuel gas supply passage holes 52a, low humidity oxidizing gas supply passage holes (additional reaction gas supply passage holes) 160, coolant discharge passage holes 54b, and oxidizing gas discharge passage holes 46b.

The first separator 154 has, in the oxidizing gas supply surface facing to a cathode 34a, a plurality of oxidizing gas passages 116a. The oxidizing gas passages 116a are communicated to the low humidity oxidizing gas supply passage hole 160 via a communication portion 162. The oxidizing gas supply surface of the first separator 154 is divided into a first oxidizing gas supply surface 164 on the upstream side, and a second oxidizing gas supply surface 166 on the downstream side. The first oxidizing gas supply surface 164, which extends from the oxidizing gas supply passage hole 46a, is continuous to the low humidity oxidizing gas supply passage hole 160, and the second oxidizing gas supply surface 166, which extends from the low humidity oxidizing gas supply passage hole 160, is continuous to the oxidizing gas discharge passage hole 46b. The area of the second oxidizing gas supply surface 166 is larger than that of the first oxidizing gas supply surface 164.

Figure 17:
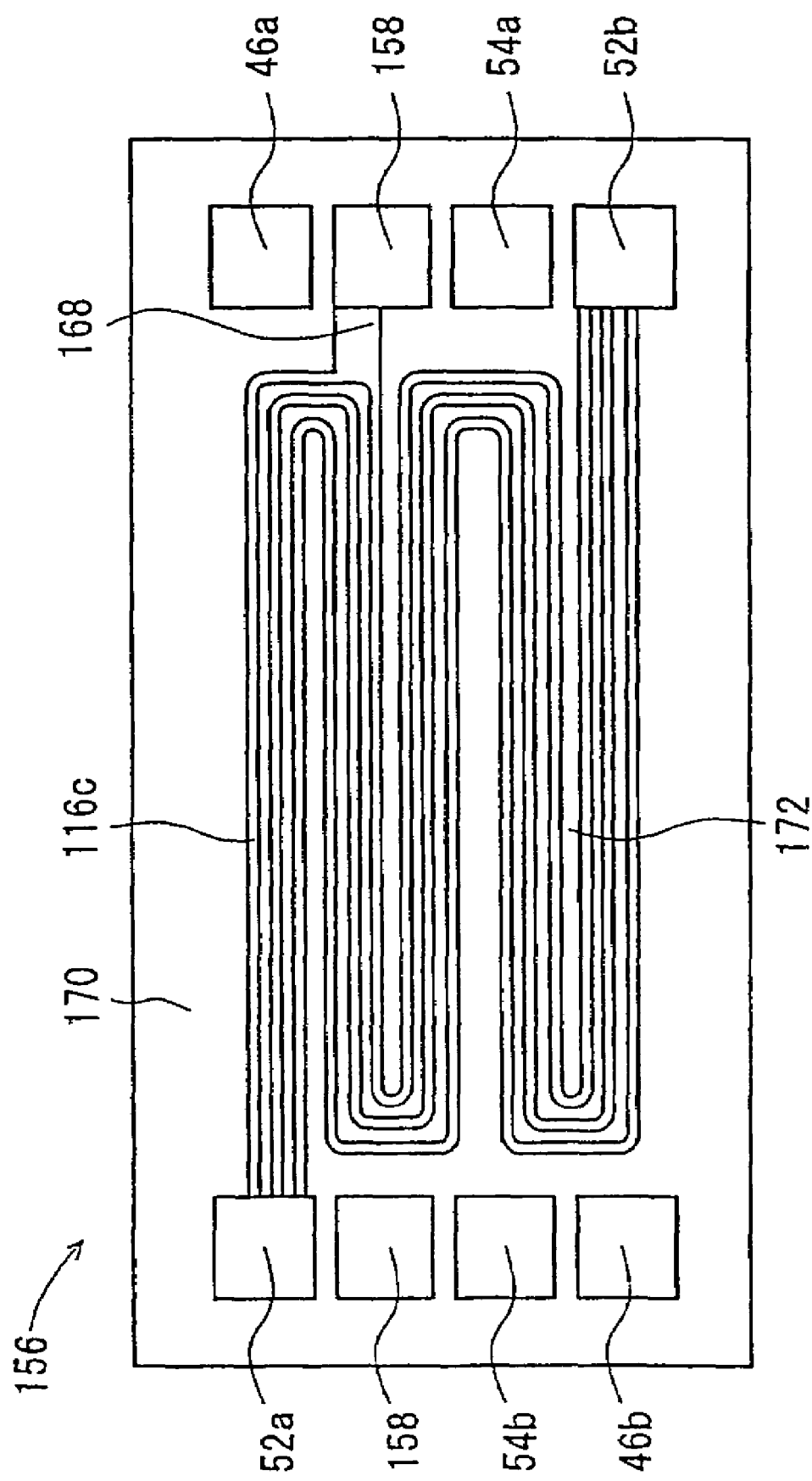
FIG. 17 is an illustrative front view of a second separator of the unit cell shown in FIG. 16.

As shown in FIG. 17, the second separator 156 has, in the fuel gas supply surface facing to an anode 36a, meandering fuel gas passages 116c communicated at the one-ends to the fuel gas supply passage hole 52a and communicated at the other ends to the fuel gas discharge passage hole 52b. The fuel gas passages 116c are communicated to the low humidity fuel gas supply passage holes 158 via a communication portion 168. The fuel gas supply surface of the second separator 156 is divided into a first fuel gas supply surface 170 on the upstream side and a second fuel gas supply surface 172 on the downstream side. The first fuel gas supply surface 170, which extends from the fuel gas supply passage hole 52a, is continuous to the low humidity fuel gas supply passage hole 158, and the second fuel gas supply surface 172, which extends from the low humidity fuel gas supply passage hole 158, is continuous to the fuel gas discharge passage hole 52b. The area of the second fuel gas supply surface 172 is larger than that of the first fuel gas supply surface 170.

According to the fifth embodiment configured as described above, it is sufficient to supply only an oxidizing gas humidified with water in an amount necessary for reaction on the first oxidizing gas supply surface 164 to the first oxidizing gas supply surface 164. That is to say, the supply of water for humidifying the oxidizing gas flowing on the second oxidizing gas supply surface can be eliminated because the oxidizing gas is humidified with water produced by reaction. Accordingly, it is possible to effectively reduce the amount of water for humidifying the oxidizing gas, and hence to easily miniaturize the humidifying structure. With respect to the fuel gas, like the oxidizing gas, it is sufficient to supply only a fuel gas humidified with water in an amount necessary for reaction on the first fuel gas supply surface 170 to the first fuel gas supply surface 170. As a result, it is possible to reduce the amount of water for humidifying the fuel gas.

Figure 18:
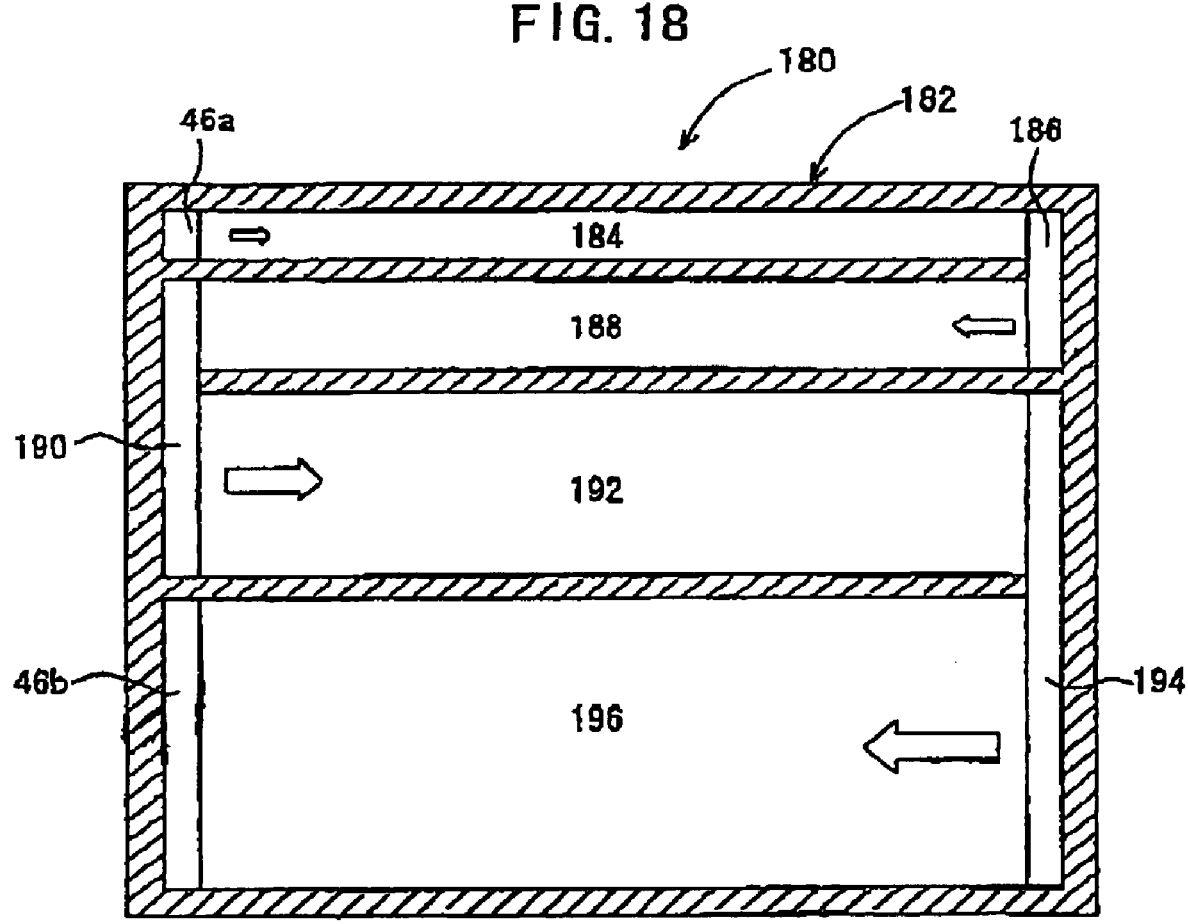
FIG. 18 is a front view of an essential portion of a unit cell of a fuel cell stack according to a sixth embodiment of the present invention.

FIG. 18 is a front view of an essential portion of a unit cell 180 of a fuel cell stack according to a sixth embodiment of the present invention.

The unit cell 180 includes, for example, a separator 182 for supplying an oxidizing gas to a cathode. The separator 182 has a first oxidizing gas supply surface 184 disposed on the upstream side in the supply direction of a reaction gas continuous to an oxidizing gas supply passage hole 46a; a second oxidizing gas supply surface 188 continuous to the first oxidizing gas supply surface 184 via a first low humidity oxidizing gas supply path 186 extending in the stack direction of the unit cell 180; a third oxidizing gas supply surface 192 continuous to the second oxidizing gas supply surface 188 via the first low humidity oxidizing gas supply path 186 and a second low humidity oxidizing gas supply path 190; and a fourth oxidizing gas supply surface 196 continuous to the third oxidizing gas supply surface 192 via the second low humidity oxidizing gas supply path 190 and a low humidity oxidizing gas supply path 194. The fourth oxidizing gas supply surface 196 is continuous to an oxidizing gas discharge passage hole 46b.

The area of the first oxidizing gas supply surface 184 is set to a minimum area. The area of the second oxidizing gas supply surface 188 is twice the area of the first oxidizing gas supply surface 184; the area of the third oxidizing gas supply surface 192 is twice the area of the second oxidizing gas supply surface 188; and the area of the fourth oxidizing gas supply surface 196 is twice the area of the third oxidizing gas supply surface 192.

According to the sixth embodiment configured as described above, it is sufficient to supply only an oxidizing gas humidified with water in an amount necessary for reaction on the first oxidizing gas supply surface 184 to the first oxidizing gas supply surface 184. That is to say, the supply of water for humidifying the oxidizing gas flowing on the second, third, and forth oxidizing gas supply surfaces 188, 192, and 196 can be eliminated because the oxidizing gas is humidified by water produced by reaction. As a result, it is possible to significantly reduce the amount of water necessary for humidifying the oxidizing gas, and hence to easily miniaturize the humidifying structure.

Figure 19:
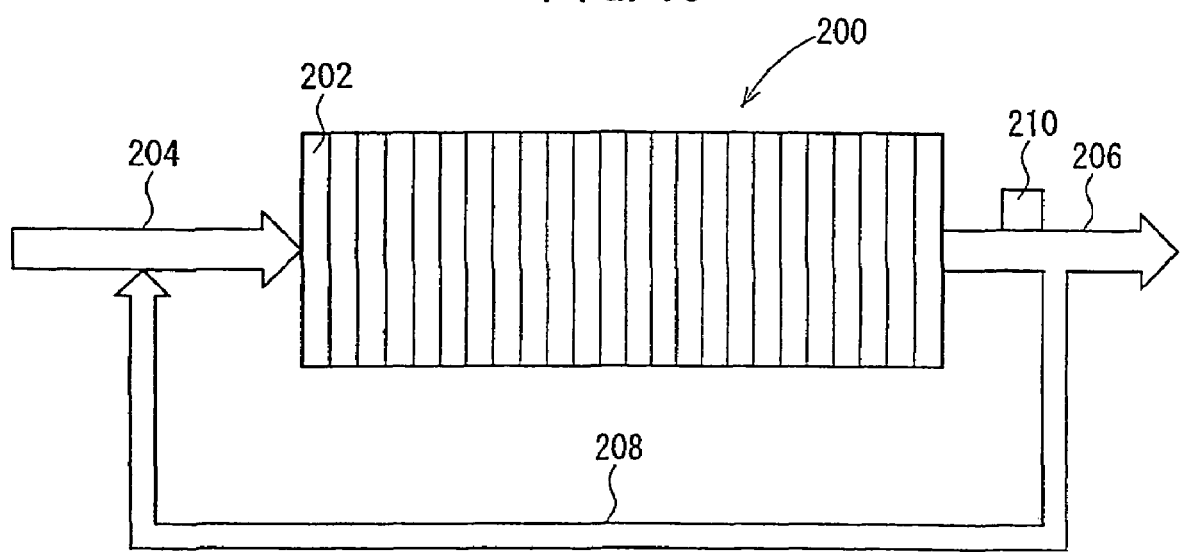
FIG. 19 is a schematic illustrative view of a fuel cell stack according to a seventh embodiment of the present invention.

FIG. 19 is a schematic illustrative view of a fuel cell stack 200 according to a seventh embodiment of the present invention. The fuel cell stack 200 has a plurality (for example, 200 pieces) of unit cells 202.

The fuel cell stack 200 has, on the inlet side, an oxidizing gas supply path 204 and has, on the outlet side, an oxidizing gas discharge path 206. The fuel cell stack 200 also has a return path 208 for returning produced water from the oxidizing gas discharge path 206 to the oxidizing gas supply path 204.

With this configuration, since the produced water contained in the spent oxidizing gas is returned to the oxidizing gas supply path 204 via the return path 208, it is possible to desirably humidify the whole fuel cell stack 200, and hence to easily operate the fuel cell stack 200 without addition of water for humidification. In addition, the above description has been made with regard to the oxidizing gas side; however, the same is true for the fuel gas side.

In the configuration shown in FIG. 19, a humidity sensor 210 may be provided in proximity to the oxidizing gas discharge path 206. In this case, when the outlet humidity of the fuel cell stack 200 becomes a specific value or more, the humidification of the oxidizing gas supplied from the oxidizing gas supply path 204 into the fuel cell stack 200 can be stopped.

It is to be noted that the first to seventh embodiments can be carried out not only singly but also in combination as needed.

Although certain preferred embodiments of the present invention have been shown and described in detail, it should be understood that various changes and modifications may be made therein without departing from the scope of the appended claims.

INDUSTRIAL APPLICABILITY

According to the fuel cell stack and the operating method thereof according to the present invention, the discharge passage holes in the first sub-stack are communicated in series to the supply passage holes in the second sub-stack disposed on the downstream side in the supply direction of a reaction gas, whereby the second sub-stack can be humidified by making use of water produced in the first sub-stack. As a result, it is possible to effectively reduce the amount of water necessary for humidifying the whole fuel cell stack, and hence to miniaturize the humidifying structure.

According to the present invention, at least one reaction surface of each unified body is divided into a first reaction surface on the upstream side and a second reaction surface on the downstream side, wherein a reaction gas previously humidified with water in an amount necessary for reaction on the first reaction surface is supplied to the first reaction surface and a non-humidified reaction gas is supplied to the second reaction surface. With this configuration, the second reaction surface can be humidified by making use of water produced on the first reaction surface. As a result, it is possible to effectively reduce the water for humidifying the reaction gas and hence to miniaturize the humidifying-structure.

The invention claimed is:

1. A solid polymer electrolyte fuel cell stack comprising:
    a plurality of separators;
    a plurality of unit cells separated from each other by one of said plurality of separators, said unit cells each having a unified body including an anode, a cathode, and a solid polymer electrolyte membrane disposed between said anode and said cathode, wherein a supply passage and a discharge passage for supplying and discharging, respectively, at least one of a fuel gas and an oxidizing gas as reaction gases are formed in each of said unit cells and said plurality of separators;
    a first sub-stack having a selected number of said unit cells, said first sub-stack being disposed on an upstream side of a flow of said reaction gas;
    a second sub-stack having a selected number of said unit cells, said second sub-stack being disposed on a downstream side of the flow of said reaction gas;
    an intermediate plate provided between the first sub-stack and the second sub-stack, wherein the intermediate plate comprises:
        a plurality of passages provided along a first edge portion, at least two of the plurality of passages being connected by a connection path, and
        a plurality of passages provided along a second opposed edge portion, at least two of the plurality of passages being connected by a connection path;
    wherein said discharge passage in said first sub-stack communicates in series with said supply passage in said second sub-stack to supply an entire amount of the reaction gas discharged from the first sub-stack to the second sub-stack, and an additional reaction gas supply passage for supplying a reaction gas having a humidity lower than said reaction gas supplied to said first sub-stack is provided in said second sub-stack independently from said supply passage, wherein said reaction gas supplied to said first sub-stack is pre-humidified.

2. A solid polymer electrolyte fuel cell stack according to claim 1, wherein the intermediate plate is disposed at a portion at which said discharge passage in said first sub-stack is connected to said supply passage in said second sub-stack, and
    said intermediate plate has a communication portion for communicating said additional reaction gas supply passage to said supply passage in said second sub-stack.

3. A solid polymer electrolyte fuel cell stack according to claim 1, wherein each of said unit cells constituting said second sub-stack has a mixing portion in which said additional reaction gas supply passage is communicated to said supply passage in said second sub-stack, said mixing portion being adapted to mix the residue of said reaction gas having been used for reaction with said low humidity reaction gas and to supply the mixture to said unified body of each of said unit cells constituting said second sub-stack.

4. A solid polymer electrolyte fuel cell stack according to claim 1, wherein said reaction gas is an oxidizing gas, and the number of said unit cells constituting said second sub-stack is larger than the number of said unit cells constituting said first sub-stack.

5. A solid polymer electrolyte fuel cell stack according to claim 1, wherein the intermediate plate comprises:
    a plurality of oxidizing gas supply passages and a low humidity oxidizing gas supply passage along the first edge portion, and
    a coolant supply passage, a coolant discharge passage, a low humidity fuel gas supply passage and a plurality of fuel gas supply passages along the second edge portion.

6. A solid polymer electrolyte fuel cell stack according to claim 5, wherein:
    one of the plurality of oxidizing gas supply passages of the intermediate plate is in communication with the low humidity oxidizing gas supply passage of the intermediate plate.

7. A solid polymer electrolyte fuel cell stack according to claim 6, wherein the one of the plurality of oxidizing gas supply passages of the intermediate plate is in communication with an oxidizing gas discharge passage of the first sub-stack and an oxidizing gas supply passage of the second sub-stack.

8. A solid polymer electrolyte fuel cell stack according to claim 5, wherein:

one of the plurality of fuel gas supply passages of the intermediate plate is in communication with the low humidity fuel gas supply passage of the intermediate plate.

9. A solid polymer electrolyte fuel cell stack according to claim 8, wherein the one of the plurality of fuel gas supply passages of the intermediate plate is in communication with an fuel gas supply passage of the first sub-stack.

* * * * *